United States Patent
Dela Rosa et al.

(10) Patent No.: US 12,477,163 B2
(45) Date of Patent: Nov. 18, 2025

(54) MACHINE LEARNING MODEL CONTINUOUS TRAINING SYSTEM

(71) Applicant: Snap Inc., Santa Monica, CA (US)

(72) Inventors: Kevin Sarabia Dela Rosa, Seattle, WA (US); Hao Hu, Bellevue, WA (US); Yanjia Li, Torrance, CA (US)

(73) Assignee: Snap Inc., Santa Monica, CA (US)

( * ) Notice: Subject to any disclaimer, the term of this patent is extended or adjusted under 35 U.S.C. 154(b) by 236 days.

(21) Appl. No.: 18/326,724

(22) Filed: May 31, 2023

(65) Prior Publication Data

US 2024/0406477 A1    Dec. 5, 2024

(51) Int. Cl.
*H04N 21/25* (2011.01)
*G06V 10/774* (2022.01)
(Continued)

(52) U.S. Cl.
CPC ......... *H04N 21/251* (2013.01); *G06V 10/774* (2022.01); *G06V 20/41* (2022.01); *G06V 20/46* (2022.01); *H04N 21/23418* (2013.01)

(58) Field of Classification Search
CPC ........... H04N 21/251; H04N 21/23418; G06V 10/774; G06V 20/41; G06V 20/46; G06V 20/70; G06N 3/0455; G06N 3/0464; G06N 3/047; G06N 3/0475; G06N 3/048; G06N 3/084; G06N 3/088; G06N 3/0895; G06N 3/09; G06N 3/091; G06N 3/092;
(Continued)

(56) References Cited

U.S. PATENT DOCUMENTS 10,410,138 B2    9/2019    Maor et al.
2012/0208166 A1    8/2012    Ernst et al.
(Continued)

FOREIGN PATENT DOCUMENTS

WO    2018141942    8/2018

OTHER PUBLICATIONS

"AWS re:Invent 2019: Build accurate training datasets with Amazon SageMaker Ground Truth (AIM308)", [Online] Retrieved from the Internet: <URL: https://www.youtube.com/watch?v=6WJxzKsIFKA>, (Dec. 5, 2019), 1 pg.
(Continued)

*Primary Examiner* — Christopher Wait
(74) *Attorney, Agent, or Firm* — Schwegman Lundberg & Woessner, P.A.

(57) ABSTRACT

Described is a system for performing a set of machine learning model training operations that include: accessing media content items associated with interaction functions initiated by users of an interaction system, generating training data including labels for the media content items, extracting features from a media content item of the media content items, identifying additional media content items to include in the training data based on the extracted features from the media content item, processing the training data using a machine learning model to generate a media content item output; and updating one or more parameters of the machine learning model based on the media content item output. The system checks whether retraining criteria has been met, and repeats the set of machine learning model training operations to retrain the machine learning model.

20 Claims, 12 Drawing Sheets

(51) Int. Cl.
*G06V 20/40* (2022.01)
*H04N 21/234* (2011.01)

(58) Field of Classification Search
CPC .......... G06N 3/096; G06N 5/01; G06N 20/10; G06N 3/0442
See application file for complete search history.

(56) References Cited

U.S. PATENT DOCUMENTS

| | | |
|---|---|---|
| 2017/0262633 A1 | 9/2017 | Miserendino et al. |
| 2019/0258900 A1 | 8/2019 | Baikadi et al. |
| 2020/0012962 A1 | 1/2020 | Dent et al. |
| 2021/0012239 A1* | 1/2021 | Arzani .................... H04L 43/50 |
| 2021/0027182 A1 | 1/2021 | Harris et al. |
| 2022/0121955 A1 | 4/2022 | Chavoshi et al. |
| 2022/0230089 A1 | 7/2022 | Peraud et al. |
| 2024/0428470 A1 | 12/2024 | Dela Rosa et al. |

OTHER PUBLICATIONS

Hu, Derek Hao, "Towards Continuous Computer Vision Model Improvement with Kubeflow", [Online] Retrieved from the Internet: <URL: https://www.youtube.com/watch?v=9UPnCo-LG04>, (Nov. 22, 2019), 1 pg.

"International Application Serial No. PCT/US2024/034814, International Search Report mailed Sep. 13, 2024", 3 pgs.

"International Application Serial No. PCT/US2024/034814, Written Opinion mailed Sep. 13, 2024", 8 pgs.

"Can you create a Bitmoji from a picture?—Quora", XP093200757, [Online]. Retrieved from the Internet: <https://www.quora.com/Can-you-create-a-Bitmoji-from-a-picture/answer/Clossen-Gabrial>, (2021), 1 pg.

"Augmented Reality (AR) tutorial for beginners using Unity 2022", XP093200647, [Online]. Retrieved from the Internet: <https://www.youtube.com/watch?v=gpaq5bAjya8>, (Jun. 27, 2022), 2 pgs.

"Algorithm—Image similarity comparison—Stack Overflow", [Online]. Retrieved from the Internet: <https://stackoverflow.com/questions/5730631/image-similarity-comparison>, (Jun. 28, 2017), 5 pgs.

"International Application Serial No. PCT/US2024/031880, International Search Report mailed Oct. 16, 2024", 3 pgs.

"International Application Serial No. PCT/US2024/031880, Written Opinion mailed Oct. 16, 2024", 13 pgs.

Eskenazi, Cecile, "Snapchat's 3D animated Bitmoji avatar in the real-world, via Snapchat's AR camera", XP093200748, [Online]. Retrieved from the Internet: <https://vnm.youtube.com/shorts/uvgQ-JsUZ1c>, (Sep. 23, 2017), 1 pg.

Hu, Benyi, "PyRetri: A PyTorch-based Library for Unsupervised Image Retrieval by Deep Convolutional Neural Networks", arXiv:2005.02154v2 [cs.IR], (Aug. 5, 2020), 4 pgs.

Ko, Byungsoo, "A Benchmark on Tricks for Large-scale Image Retrieval", arXiv:1907.11854v2 [cs.CV], (Apr. 23, 2020), 9 pgs.

Mahajan, Dhruv, "Exploring the Limits of Weakly Supervised Pretraining", arXiv:1805.00932v1 [cs.CV], (May 2, 2018), 23 pgs.

Matsui, Yusuke, "Billion-scale Approximate Nearest Neighbor Search", CVPR 2020 Tutorial, [Online]. Retrieved from the Internet: <URL: https://www.youtube.com/watch?v=SKrHs03i08Q&list=PLKQB14e0EJUWaTnwgQogJ3nSLzEFNn9d8&t=53s>, (2020), 1 pg.

Nace, Trevor, "How to Create Snapchat Bitmoji With Camera", XP093200719, [Online]. Retrieved from the Internet: <URL: https://www.youtube.com/watch?v=Ldz5wUzHSUk>>, (Dec. 5, 2023), 2 pgs.

Radenovic, Filip, "Revisiting Oxford and Paris: Large-Scale Image Retrieval Benchmarking", arXiv:1803.11285v1 [cs.CV], (Mar. 29, 2018), 10 pgs.

Tan, Mingxing, "EfficientNet: Rethinking Model Scaling for Convolutional Neural Networks", arXiv:1905.11946v5 [cs. LG], (2019), 11 pgs.

Web Whizz, "How to Scan Face for Bitmoji on Snapchat 2024", XP093200775, [Online]. Retrieved from the Internet: <URL: https://www.youtube.com/watch7v- HRb3UmrW91, (Aug. 26, 2022), 2 pgs.

* cited by examiner

MACHINE LEARNING MODEL CONTINUOUS TRAINING SYSTEM

TECHNICAL FIELD

The present disclosure relates generally to machine learning models, and more specifically to continuous training of machine learning models.

BACKGROUND

As the popularity of Artificial Intelligence (AI) grows, companies use machine learning models in various ways, which is transforming how we process, analyze, and interact with visual data. The use of AI in image processing involves training algorithms, particularly deep learning models like Convolutional Neural Networks (CNNs), to perform tasks that range from low-level image manipulation to high-level understanding and generation of visual content. Some prominent applications of AI in images include image classification, object detection, image segmentation, facial recognition, and style transfer.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
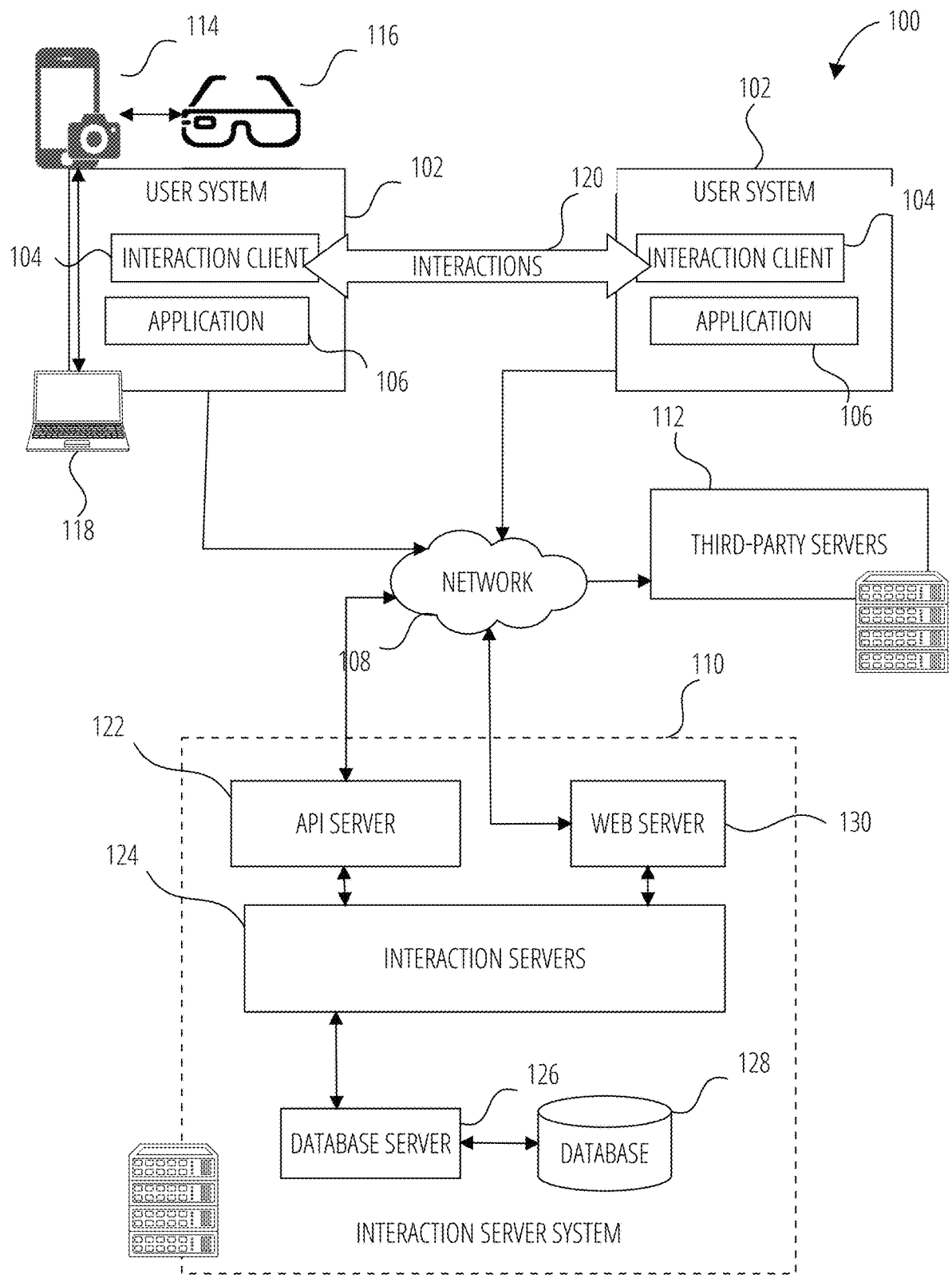
FIG. 1 is a diagrammatic representation of a networked environment in which the present disclosure may be deployed, according to some examples.

Traditional systems for training machine learning models involve human intervention at various stages of the model development process, such as data preprocessing, feature extraction, model selection, and model evaluation. This approach presents challenges that negatively impact performance, efficiency, and accuracy of the machine learning models.

One challenge is the amount of time to collect, label and prepare training data, especially when dealing with large datasets, multiple models, and intricate features. Another challenge is in updating machine learning models to incorporate new data. As the volume of data increases, training machine learning models to scale and efficiently process large amounts of data is not possible without new methods to do so.

Further, machine learning models are trained on static datasets and updated infrequently, and thus, do not capture the latest trends or user behaviors, leading to decreased accuracy. Traditional systems also struggle to adapt to changes in data distribution or underlying patterns quickly, as model updates require extensive human intervention.

Example interaction systems address the issues described above by improving machine learning model training based on new data created by users on an online platform. The disclosed machine learning model processes can quickly access and process large amounts of new user data, reducing the time needed for model training and evaluation. Moreover, the interaction systems efficiently access and process content items, generate labels, and update training data sets, saving valuable time and resources.

Example interaction systems can handle growing data volumes and update models more frequently, ensuring that the models stay current with the latest trends in the data. Such interaction systems do so by updating time periods where data is collected and repeats training operations on newly created user data, enabling the model to stay current and learn from the most recent data. Moreover, new user data is continuously added to the training data set. By processing new user data within updated time periods and adding the new user data to the training data set, interaction systems save time and resources in generating training data.

Example interaction systems collect new data as users upload interactions onto the interaction system, allowing for continuous model updates, which helps the model stay relevant and capture the latest trends or user behaviors. In some cases, the interaction system improves data preprocessing and labeling, reducing errors while ensuring consistency in the process. By continuously retraining the model with new data, the interaction system keeps the model up-to-date and maintains its performance. The disclosed processes of the interaction system allows it to easily scale to handle larger datasets and frequent updates. Moreover, the continuous learning approach ensures that the model adapts to changes in data distribution or underlying patterns over time, providing more accurate and relevant predictions.

When the effects in this disclosure are considered in aggregate, one or more of the methodologies described herein may improve known systems, providing additional functionality (such as, but not limited to, the functionality mentioned above), making them easier, faster, or more intuitive to operate, and/or obviating a need for certain efforts or resources that otherwise would be involved in the machine learning model training process. Computing resources used by one or more machines, databases, or networks may thus be more efficiently utilized or even reduced.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Programming Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an API server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The API server 122 receives and transmits interaction data (e.g., commands and message payloads) between the interaction servers 124 and the user systems 102 (and, for example, interaction clients 104 and other application 106) and the third-party server 112. Specifically, the API server 122 provides a set of interfaces (e.g., routines and protocols) that can be called or queried by the interaction client 104 and other applications 106 to invoke functionality of the interaction servers 124. The API server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from third-party servers 112 for example, a markup-language document associated with the small-scale application and processing such a document.

In response to determining that the external resource is a locally installed application 106, the interaction client 104 instructs the user system 102 to launch the external resource by executing locally stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
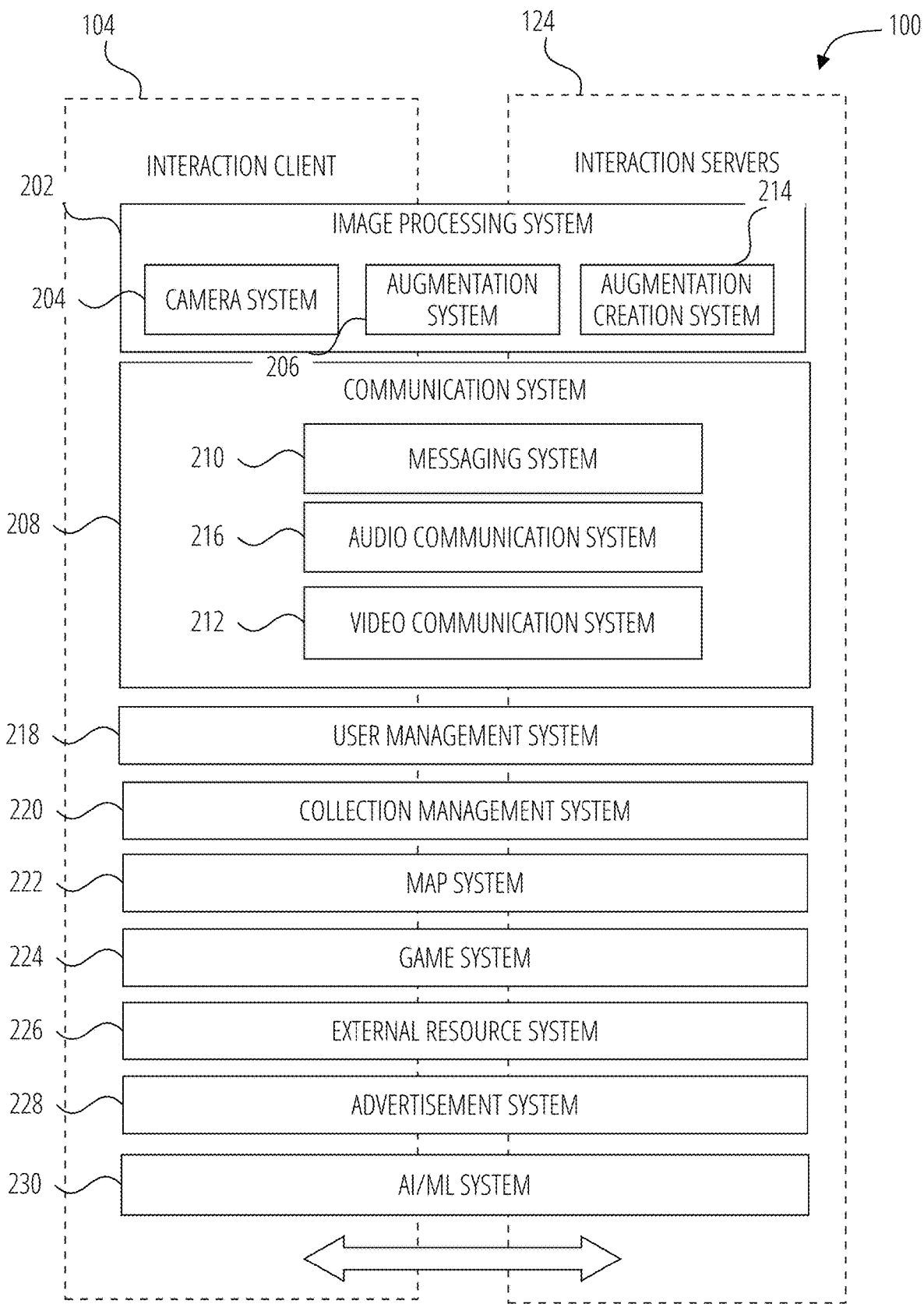
FIG. 2 is a diagrammatic representation of an interaction system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other component through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 902 of a user system 102. These augmentations are selected by the augmentation system 206 and presented to a user of an interaction client 104, based on a number of inputs and data, such as for example:

Geolocation of the user system 102; and

Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports Augmented Reality (AR) developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104. The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes APIs with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 can include a machine learning model to label training data. The artificial intelligence and machine learning system 230 can apply training data to machine learning models to train such models.

The artificial intelligence and machine learning system 230 operates with the image processing system 202 and the camera system 204 to analyze images and extract information such as objects, text, or faces. This information can then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

Data Architecture

Figure 3:
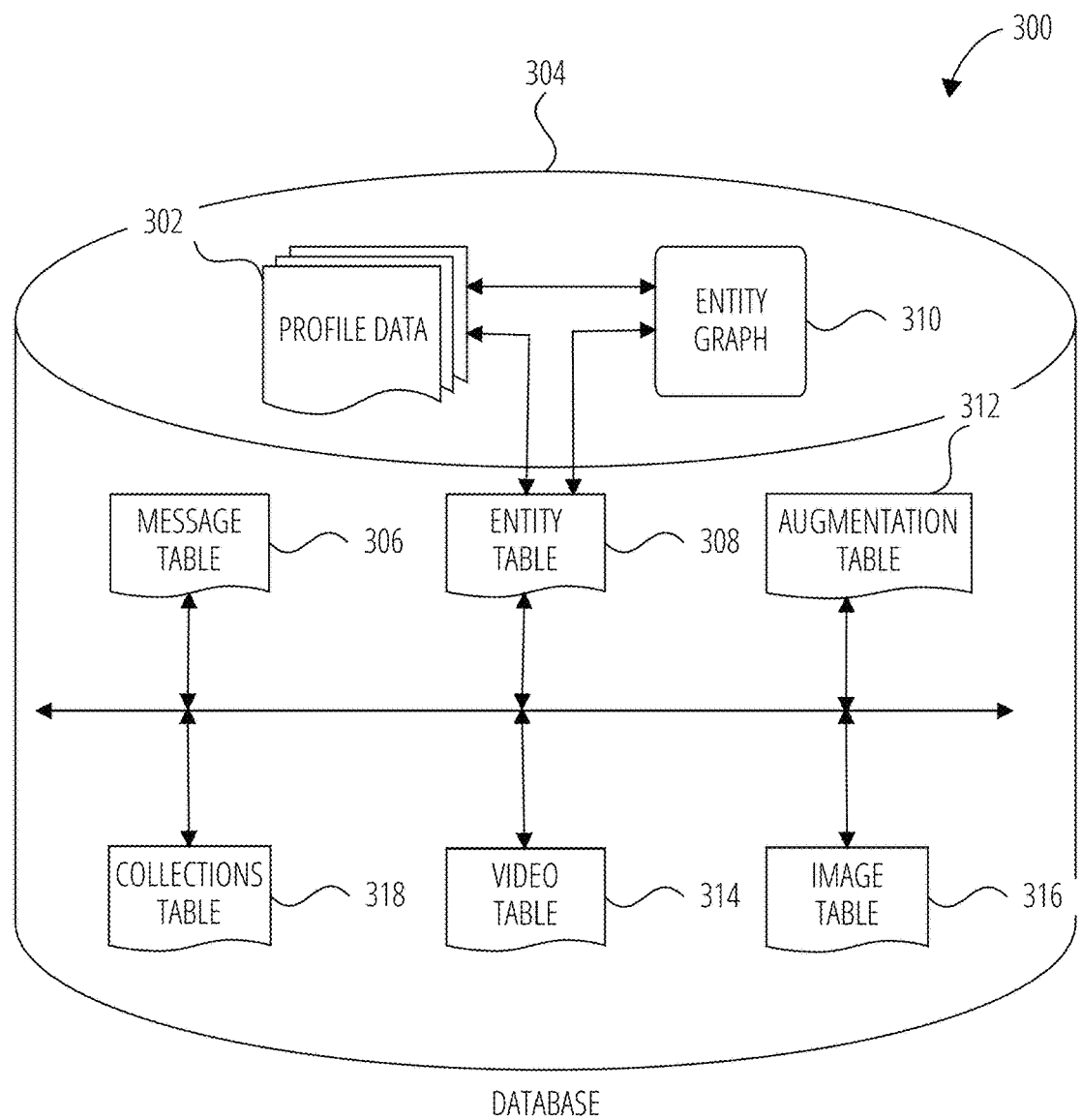
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100. A friend relationship can be established by mutual agreement between two entities. This mutual agreement may be established by an offer from a first entity to a second entity to establish a friend relationship, and acceptance by the second entity of the offer for establishment of the friend relationship.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of the user system 102 and then displayed on a screen of the user system 102 with the modifications. This also includes modifications to stored content, such as video clips in a collection or group that may be modified. For example, in a user system 102 with access to multiple augmented reality content items, a user can use a single video clip with multiple augmented reality content items to see how the different augmented reality content items will modify the stored clip. Similarly, real-time video capture may use modifications to show how video images currently being captured by sensors of a user system 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In some examples, tracking of points on an object may be used to place an image or texture (which may be two-dimensional or three-dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated. Then, a mesh based on the characteristic points is generated for each element of the object. This mesh is used in the following stage of tracking the elements of the object in the video stream. In the process of tracking, the mesh for each element is aligned with a position of each element. Then, additional points are generated on the mesh.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing the color of areas; removing some part of areas from the frames of the video stream; including new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation. In some examples of a computer animation model to transform image data using face detection, the face is detected on an image using a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

The system can capture an image or video stream on a client device (e.g., the user system 102) and perform complex image manipulations locally on the user system 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the user system 102.

In some examples, the system operating within the interaction client 104 determines the presence of a face within the image or video stream and provides modification icons associated with a computer animation model to transform image data, or the computer animation model can be present as associated with an interface described herein. The system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

Machine Learning Model Continuous Training System

Figure 4:
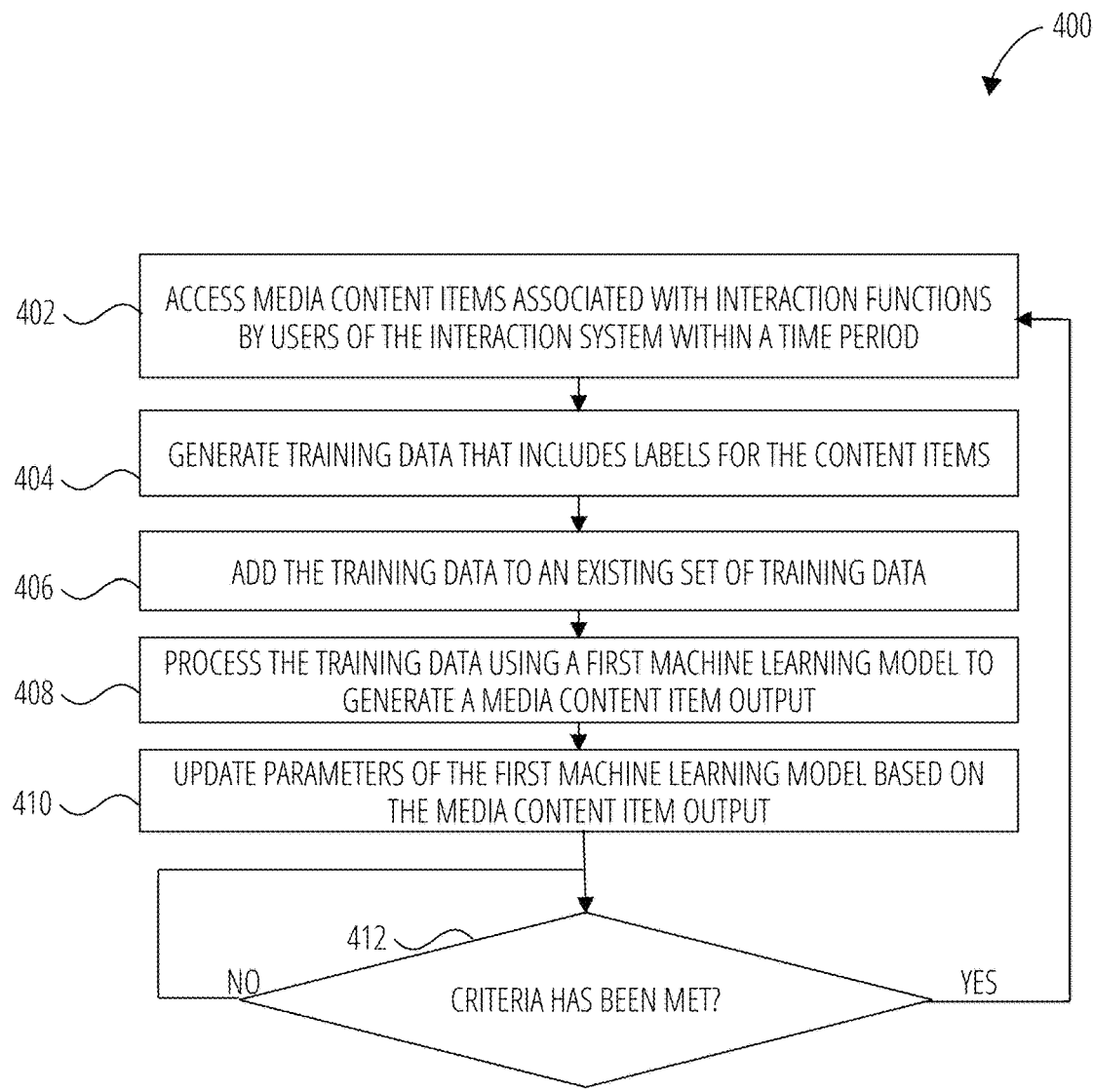
FIG. 4 illustrates a method for continuous training of a machine learning model, according to some examples.

FIG. 4 illustrates a method 400 for continuous training of a machine learning model, according to some examples. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

FIG. 4 is described as being performed by certain processes and computing systems, such as a particular machine learning model or computer vision model, but such processes can be performed by one or more of the same or different machine learning models, computer vision models, or a combination thereof.

At operation 402, the method includes accessing media content items associated with interaction functions by users of the interaction system within a time period. In some cases, the media content items include:

Emojis that are small images or icons that represent emotions, reactions, or objects.

Stickers are larger images or animations that can be sent in a chat window.

Images or photographs that can be sent to other users to share visual information or document a particular event.

Video clips that can be used to share recorded content or document a particular event.

Audio messages that can be shared to communicate audible communication.

Graphics Interchange Formats (GIFs) that can include short animations used to add humor or express emotions.

Content augmentations that can enhance images or videos by adjusting the color or appearance or adding interactive elements such as animations and facial transformations in real-time to a camera feed.

Interaction functions include features and/or an environment within the interaction system 100 where users can apply one or more videos, messages, stickers, or other media content items. Interaction functions include displaying media content items from other users, such as publishers, creators, and influencers, where users can explore and subscribe to different channels to receive updates on their favorite content. Media content items can include video clips, text, links, images, engagement information (such as likes, shares, or comments), hashtags, other information related to subscription channels, and/or the like posted by such users.

Interaction functions include map and location functions, such as users sharing their location with friends and viewing their friends' locations on a map or exploring a map with points of interest by other users categorized by location and events. Media content items can include content pertaining to certain locations and related information (such as friend's purchase history on a restaurant), geotagged information (such as posts or check-ins on certain location), suggested events near a location, location-based search results, location-based targeted advertising, geofencing of virtual boundaries around physical locations, and/or the like.

Interaction functions include various filters and content augmentations to enhance images, videos, or other media content items to share with others, such as by adjusting the color or appearance or adding interactive elements such as animations and facial transformations, in real-time. Media content items can include the filters or augmentations themselves, individual enhancements made to the images or videos, recommendations of filters or augmentations made to the user, and/or the like.

Interaction functions include saving favorite media content items with other users in a private archive, where users can access these saved media content items later, edit them, or share them with friends. Media content items can include text posts, images, videos, links, live streaming video, invites, hashtags, location-sharing, audio, memes, and/or the like shared between two users.

Interaction functions include personalized avatars which can be used as a profile picture to be viewed by others and in stickers, chat, and image/video decorations. Media content items can include the avatars themselves, customizations made to the avatar, engagement between users using the avatars (such as sharing or modifying the avatar when communicating with another user), and/or the like.

Interaction functions include multiplayer games that users can play with their friends directly within the user interface of the system to share messages and media content items. Media content items can include social interaction data (such as text, video, or audio shared with other users), in-game items, in-game currency, quests or missions, screen shots or video clips, user-generated content (such as custom maps or modifications), and/or the like.

Interaction functions include data captured by an Augmented Reality (AR) device. In some examples, the media content items can include motion and position data, such as data from accelerometers, gyroscopes, and magnetometer data to track user movement or orientation.

In some examples, the interaction system 100 captures eye-tracking data, which monitors the user's eye movements and focus, gaze-based interactions, objects the user is focused (or not focused) on, or user attention patterns. In some examples, the interaction system 100 captures gesture and hand tracking data, such as data related to hand movements and gestures. In some examples, the interaction system 100 captures facial expressions. In some examples, the interaction system 100 captures biometric data, such as heart rate, body temperature, or skin conductivity. Media content items can include physical or digital items that the user is engaged with (e.g., viewing the item for a period of time or selection of an item), gestures or touch inputs, user preferences and behavior, voice and/or audio data, device information, environmental data (such as lighting, spatial dimensions), and/or the like.

In some examples, the interaction system 100 captures data related to user interactions within the virtual or augmented environment, such as objects or buttons users interact with, the time spent in specific areas, or the choices users make. In some examples, the interaction system 100 captures voice data, voice recognition, voice commands, and/or the like. In some examples, the interaction system 100 captures location data, such as a user's GPS location. In some examples, the interaction system 100 captures usage data related to how and when the devices are used, session duration, frequency of use, and user engagement with specific content or applications. Such captured data can be the media content items themselves or data used to derive the media content items.

Interaction functions include a chat window where messages, stickers, emojis, and other media content items are shared between users. Interaction functions include users sending photos or videos to friends, either individually or in groups, which can be edited with text, stickers, filters, and drawings before being sent. Interaction functions include videos, audio, text, or other communications that disappear after certain conditions are met, such as being viewed once or setting a time limit, creating a more ephemeral and casual sharing experience. Media content items can include the messages, emojis, or media content items that are shared in the chat window.

Interaction functions include activities between users and other users, and the media content items can include content shared between the users. In some examples, other users that are associated with the user (such as within an interaction function of the interactive system) include followers or friends, where users can follow or be followed by others, or form some type of relationship such that other users can see certain information, such as each other's posts on their feeds. In some examples, the other users can include "close" or "best" friends that can create a relationship to share additional information not available to others, such as private posts, targeted sharing of content, and/or the like. In some examples, other users are users mentioned or tagged in the user's posts, comments, chat messages, or other communication that draws the attention of the tagged user and/or can initiate conversations or discussions.

In some examples, other users are users that are involved in a message chat with the user, such as a private messaging feature that allows users to send messages directly to one another or group chats among many users. In some examples, other users are users that joined a group based on shared interests or common goals. Within these groups, users can interact, and form relationships based on the group's focus and/or share information among group members.

In some examples, other users are users who express support for users, such as through likes, comments, or shares, or vice versa (such as users expressing support for the other users). In some examples, other users are influencers or brand ambassadors that have established large followings and are seen as authorities or trendsetters in their niches. In some examples, other users are collaborators working together on projects or create content together.

Although certain examples describe interaction functions and media content items, in some cases, a described interaction function can be or include a media content item, and/or vice versa.

At operation 404, the interaction system 100 generates training data that includes labels for the media content items. The labels are important for training the machine learning models are the labels serve as a basis for supervised learning. Labels provide essential information that helps machine learning systems learn from data, generalize patterns, and make accurate predictions. Labels act as a ground truth or reference point for the machine learning models as the labels provide the correct answers or outcomes. By comparing the model's predictions to these ground truths, the machine learning models can recognize patterns that lead to a closer result to these ground truths.

In some examples, at operation 406, the interaction system 100 adds the new training data with the labeling to the existing training dataset. Adding new user data to an existing training dataset can be helpful and advantageous for training a machine learning model in several ways. Incorporating new data can lead to improved model performance, better generalization, and adaptation to evolving data patterns. Incorporating new user data can help the model learn additional patterns and relationships that were not present or underrepresented in the original dataset. This can lead to improved performance in terms of accuracy, precision, recall, or other relevant metrics.

Adding new user data can increase the diversity and representativeness of the training dataset. This helps the model learn to generalize better to unseen data, reducing the risk of overfitting and improving its performance on real-world tasks.

User behavior and data patterns may change over time. By adding new user data, the system ensures that the model stays up-to-date with these changes and remains relevant to the current context. Moreover in some cases, the original training dataset may suffer from class imbalance, where certain classes or outcomes are underrepresented. Adding new user data that includes more examples from these underrepresented classes can help address this imbalance and improve the model's ability to predict minority classes accurately.

In some cases, the labels are embedded with the training data. The interaction system 100 concatenates the label information with the text feature vector. As such, the model is trained to classify similarities in media content items considering both content and label information. The interaction system 100 applies training data with labels for supervised learning, which is a type of machine learning where the model learns to make predictions based on labeled input-output pairs. At operation 408, the interaction system 100 processes the training data using a first machine learning model to generate a media content item output.

At operation 410, the interaction system 100 updates parameters of the first machine learning model based on the media content item output. The interaction system 100 trains the machine learning model by adjusting model parameters to minimize a specific loss function or maximize a certain objective. The loss function can be determined based on the media content item output from the machine learning model with an expected media content item stored within the training data.

The interaction system 100 evaluates performance of machine learning models to ensure that the models meet desired objectives. The interaction system 100 selects appropriate evaluation metrics to measure the model's performance. Possible metrics include: a proportion of correctly identified similar media content items, proportion of true positive predictions (correctly identified similar media content items) out of all positive predictions, proportion of true positive predictions (correctly identified similar media content items) out of all actual similar media content items, and/or the like.

Once the model is trained and its performance is satisfactory, the interaction system 100 deploys the model in a production environment. As user creatives (e.g., media content items) are made and labels generated, these are added to the system, and the model can be used to identify similar media content items based on their feature vectors (including label information) and similarity scores.

At operation 412, the interaction system 100 continuously checks whether a particular criterion has been met. Once the criterion has been met, the interaction system 100 returns to operation 402 to access newly generated media content items and retrain the model automatically. Example criteria include a time, such as scheduling retraining at regular intervals (e.g., daily, weekly, or monthly).

In some examples, the interaction system 100 initiates retraining once a certain amount of new user data has been collected, a significant drop in performance which may be an indication that the model needs to be retrained with new data, concept drift where the underlying data distribution changes indicative of new or old interest in topics, or users report a certain number of false positives or false negatives.

In some examples, retraining of the model is triggered based on significant events or when there is an influx of new content related to a particular topic (e.g., during an election, major product launch, or viral event), and/or the like. In some examples, the interaction system 100 uses a plurality of criteria to initiate retraining of the model. In some examples, the interaction system 100 requires one or more criteria to be met, such as two criteria from the above, in order to initiate retraining. By considering these criteria, the interaction system 100 can ensure that the machine learning model remains effective and relevant to identifying similar media content items.

In addition, the interaction system 100 accesses user data on a centralized database, where the user data is generated throughout the platform from multiple interactions by interaction clients 104 used by different users. As such, access to sensitive data such as user preferences, posts, content augmentation selections, and/or the like is limited to the interaction system improving data security technology.

Moreover, because some examples describe one or more of the processes being performed on the interaction system 100, remote from the interaction client 104, the processors can analyze large amounts of data, run complex algorithms/processes (such as collecting massive amounts of new data and retraining very complex machine learning models through computationally heavy processes), and have access to databases that may not be available to the interaction client 104. Accordingly, this practical application is a technological improvement, as the processing can be performed without being dependent on the hardware, operating system, and/or software of the interaction client 104. Moreover, such processing on the server side can result in faster processing with an increased processing power of servers, rather than being limited to the processing power of an interaction client 104 (such as a mobile phone, laptop, or AR device). Furthermore, remote processing can improve on data privacy and network communication security, as sensitive data do not have to be passed to and from the interaction client 104 over the Internet.

Systems and methods described herein include training a machine learning network, such as continuous training of a machine learning model based on new user data. The machine learning network can be trained to perform specific functions, such as identifying an intent of a user, generating a prompt for response generation, generating content augmentations, identifying topics of posts and comments by users, providing recommended media content items based on user profiling, and/or the like. The machine learning algorithm can be trained using historical information that include historical interaction data among users (such as posts, comments, content augmentations, historical user selections on the interaction system, and/or the like).

Training of models, such as artificial intelligence models, is necessarily rooted in computer technology, and improves modeling technology by using training data to train such models and thereafter applying the models to new inputs to make inferences on the new inputs. Here, the new inputs can be a new set of user data used to trigger retraining of the machine learning model. In some examples, the interaction system 100 retrains the model after a certain time period (e.g., monthly) or after a number of new user data is available since the last retraining of the model.

Such training involves complex processing that typically requires a lot of processor computing and extended periods of time with large training data sets, which are typically performed by massive server systems. Training of models can require logistic regression and/or forward/backward propagating of training data that can include input data and expected output values that are used to adjust parameters of the models. Such training is the framework of machine learning algorithms that enable the models to be applied to new and unseen data (such as new interaction data) and make predictions for which the model was trained based on the weights or scores that were adjusted during training. Such training of the machine learning models described herein reduces false positives and increases the performance of outputting correct and relevant data that the machine learning model is trained for.

Extended Reality (XR) is an umbrella term encapsulating Augmented Reality (AR), Virtual Reality (VR), Mixed Reality (MR), and everything in between. For the sake of simplicity, examples are described using one type of system, such as XR or AR. However, it is appreciated that other types of systems apply.

Figure 5:
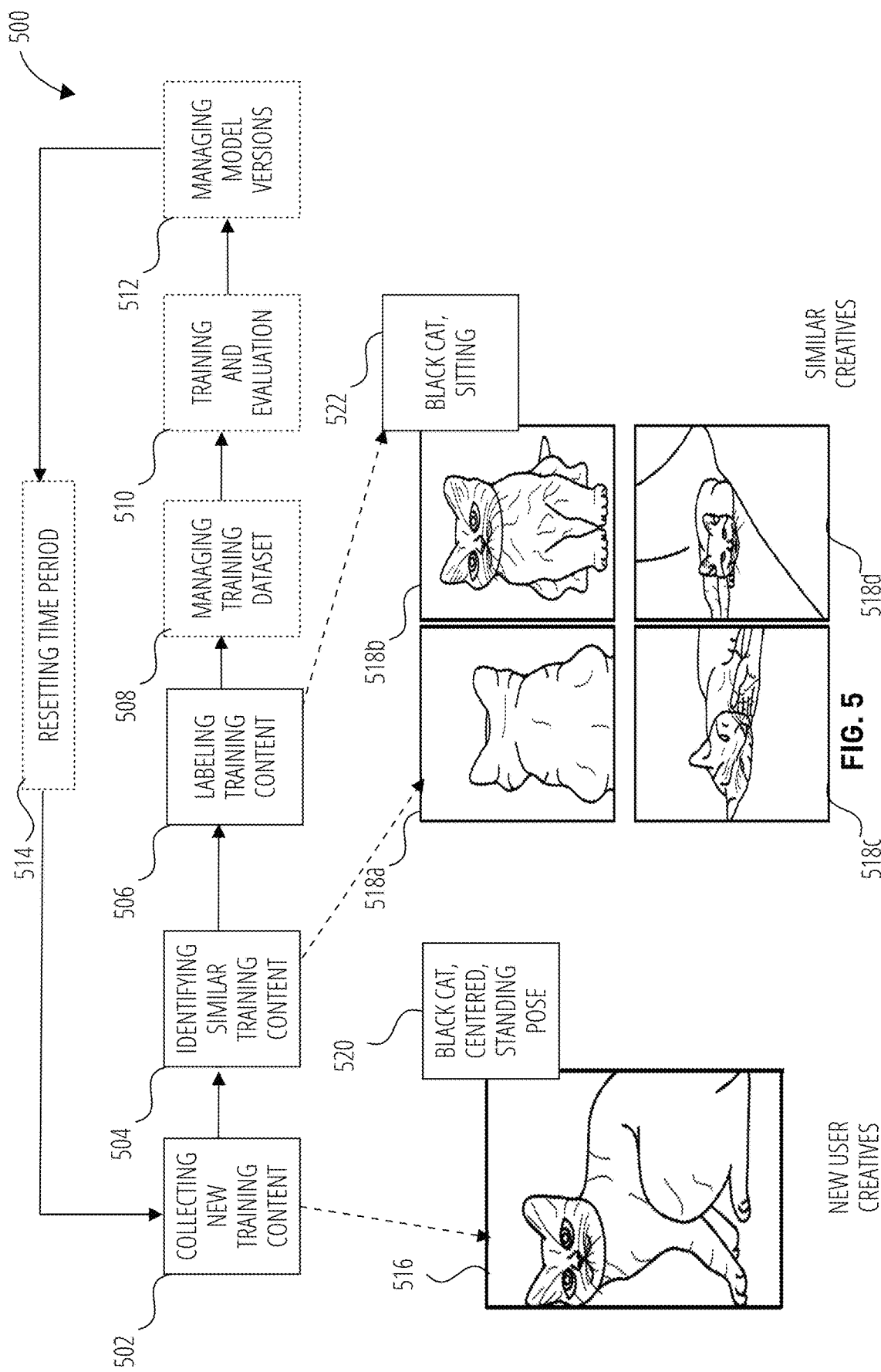
FIG. 5 and FIG. 6 illustrate an architecture for continuous training of a machine learning model, according to some examples.
Figure 6:
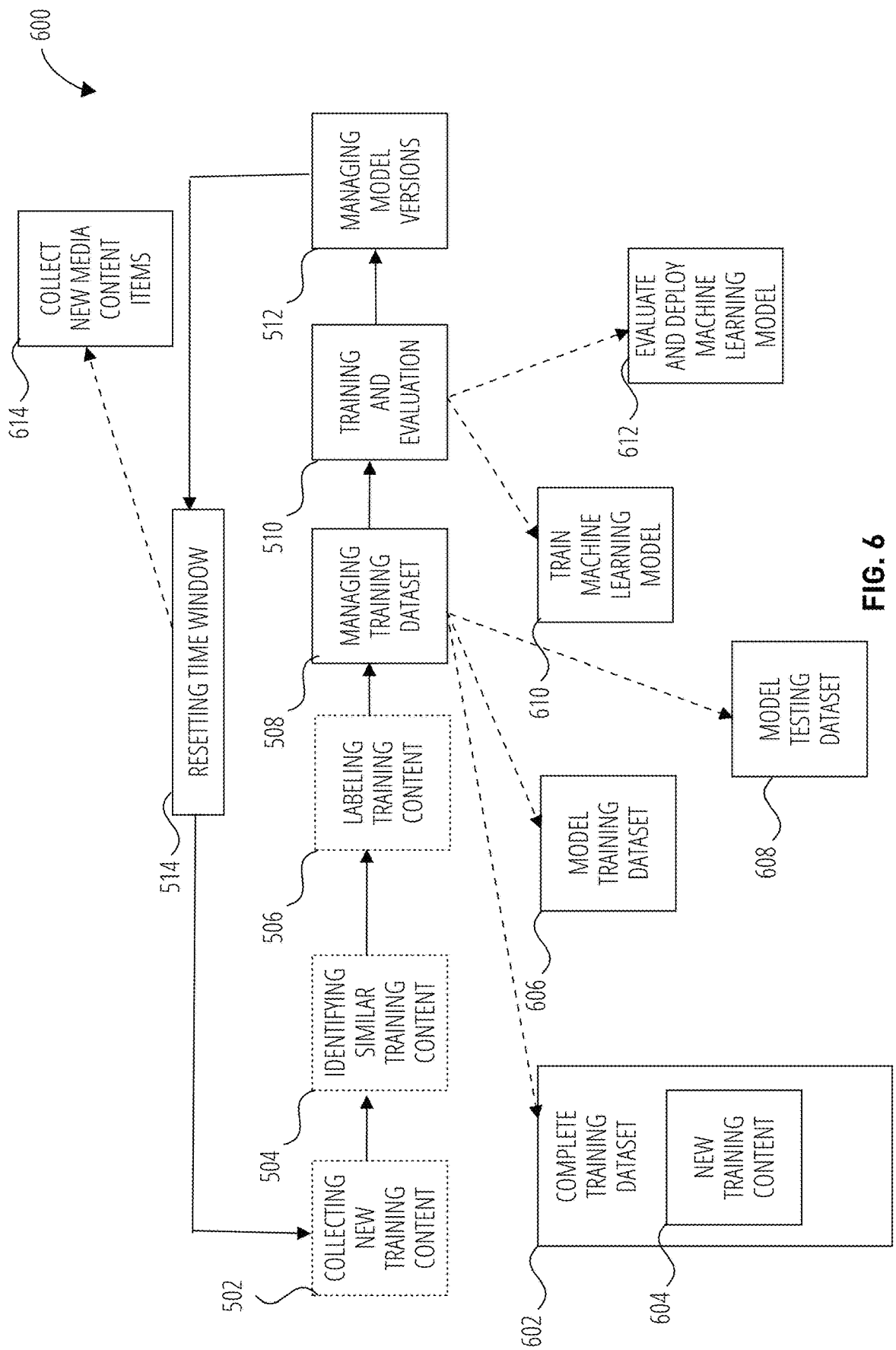

FIGS. 5 and 6 illustrate an architecture 500, 600 for continuous training of a machine learning model, according to some examples. Although the architecture 500, 600 depicts a particular sequence of operations, the sequence may be altered without departing from the scope of the present disclosure. For example, some of the operations depicted may be performed in parallel or in a different sequence that does not materially affect the function of the architecture 500, 600. In other examples, different components of an example device or system that implements the architecture 500, 600 may perform functions at substantially the same time or in a specific sequence. Moreover, operations of method 400 can be included or replace operations described for architecture 500, 600, and vice versa.

At operation 502, the interaction system 100 collects new training content. The interaction system 100 collects user data as individuals interact with various features within the platform. In some examples, the interaction system 100 collects an image 516 of a cat posted by a user.

The interaction system 100 collects a variety of different information from users. As users create posts, upload images and videos, or write comments, this content is collected and analyzed by the platform to continuously train machine learning models. This data helps the platform understand users' interests, preferences, and social connections, allowing the platform to generate and update machine learning models to deliver relevant content and recommendations.

At operation 504, the interaction system can identify similar training content to apply to the training of the machine learning model. In some examples, the interaction system 100 identifies other images 518a, 518b, 518c, 518d (collectively referred to herein as other images 518) of a cat posted by other users. As shown, the other images 518 of the cat resemble the cat in image 516 (e.g., the size, pose, color, type of cat, ears).

In some examples, the interaction system 100 identifies similar images from an original image using computer vision techniques. The interaction system 100 extracts features from images, compares the features to features identified in other images, and determines similarity based on a chosen metric.

In some cases, the other images 518 were created at a different time period or posted by users at a different time period than the original media content item. For example, the original training data could be new user data, such as media content items created in 2023, and the other similar images that are identified could be from the entire database of media content items, such as media content items created in 2019 and 2021.

In some cases, the additional media content items are identified based on metadata of the accessed media content item. The interaction system 100 can identify additional media content items based on metadata of the original media content item, such as a unique identifier of the user who posted the media content item, a date and time when the media content item was created and posted, the geolocation data (latitude and longitude) of the user when the media content item was created, information about any filters, lenses, or stickers applied to the media content item, and/or the like, and by identifying similarities with other media content items (as further described herein).

In some cases, the interaction system 100 can identify additional media content items based on text or captions added to the media content item, a number of times the media content item has been viewed by other users, a number of times the media content item has been screenshotted by other users, the time when the media content item will expire and be automatically deleted (such as 24 hours after posting), and/or the like, and by identifying similarities with other media content items (as further described herein).

In some cases, the interaction system 100 can identify additional media content items based on metrics related to user interaction with the media content item (such as replies, mentions, and shares), information about the device used to create the media content item (such as the device model, operating system, and app version), an IP address of the device used to post or create the media content item which can be used to determine the user's approximate location, and/or the like, and by identifying similarities with other media content items (as further described herein).

The interaction system 100 identifies similar images from an original image using the nearest neighbor algorithm and Euclidean distance as a similarity metric. The interaction system 100 performs feature extraction, feature comparison, and image retrieval. First, the interaction system 100 extracts features from the images that can be used to represent them. The interaction system 100 applies techniques such as handcrafted descriptors or deep learning-based methods (e.g., convolutional neural networks, or CNNs). For instance, a pre-trained CNN can be used to extract feature vectors from images by passing the images through the network and obtaining the output from an intermediate layer.

In some cases, the interaction system 100 extracts features of content augmentations. Content augmentations can modify a camera feed from a camera system in several ways by applying real-time digital effects and overlays. The interaction system 100 trains the machine learning model to detect facial features and applied effects, such as makeup, masks, or animal features, or to detect modified facial expressions, changed skin texture, or changed face shapes. The machine learning model detects features of augmentations to identify and track objects within the camera feed, and overlaying 3D models, animations, or other digital elements onto the objects.

In some cases, the machine learning model identifies features of augmentations to replace or modify the background of a camera feed with a different image, video, or pattern. The machine learning model identifies digital content overlaid onto the real-world, as seen through the camera feed, such as placing virtual furniture in a room or displaying virtual information about nearby points of interest. The machine learning model identifies added animated text, stickers, or other graphic elements to the camera feed, which can be used for emphasis, decoration, or communication.

In some cases, the machine learning model finds features of applying various color adjustments and filters to the camera feed, changing the overall look and feel of the video, such as changes to brightness, contrast, saturation, or applying vintage or artistic filters. The machine learning model identifies manipulation of the camera feed's playback speed or create time-based effects like slow motion, fast forward, or looping.

In some cases, the machine learning model is trained to find augmentations based on the device's location data, such as displaying location-specific overlays or effects in the camera feed, such as geo-filters that showcase nearby landmarks, events, or city-specific elements. The machine learning model identifies features of applying various image distortion or warping effects to the camera feed, such as fisheye lenses, kaleidoscope effects, or perspective warping.

In some cases, the machine learning model is trained to identify features related to modifying the audio captured by the camera system, applying effects like voice changers, pitch adjustments, or adding background music and sound effects.

In some cases, the interaction system 100 identifies characteristics of real-life objects shown in the camera feed. In some examples, at least one of the set of features include a real-world object, wherein the content augmentation augments, modifies, or overlays one or more digital elements on or near the real-world object detected from a camera feed of a camera system.

With the extracted feature vectors, the interaction system 100 compares the vectors using Euclidean distance as a similarity metric. Euclidean distance is a measure of the straight-line distance between two points in multidimensional space. In this case, the points are the feature vectors of the images. The formula for Euclidean distance between two points A and B in n-dimensional space is: distance (A, B)=sqrt($\Sigma$(Ai−Bi)^2) for i=1 to n, where a lower Euclidean distance indicates that the images are more similar.

In some examples, the interaction system 100 applies the nearest neighbor algorithm to find the most similar images to the original image. For each image in the dataset, the interaction system 100 calculates the Euclidean distance between the original image's feature vector and the feature vector of the image being compared. The images are then sorted based on their Euclidean distances, with the closest images being the most similar ones.

Then, the interaction system 100 returns the most similar images to the original image by selecting the top k media content items with the smallest Euclidean distances. The value of k depends on the desired number of similar media content items to be retrieved. By using the nearest neighbor algorithm and Euclidean distance, the interaction system 100 effectively identifies similar media content items from an original media content item.

In some examples, the interaction system 100 identifies similar media content items from an original media content item by applying feature extraction techniques, such as a Scale-Invariant Feature Transform (SIFT) that detects and describes local features in media content items that are invariant to scale, rotation, and illumination changes. In some cases, the interaction system 100 can apply Speeded Up Robust Features (SURF) by applying a technique called "box filters" to approximate the Gaussian filters used in SIFT.

In some examples, the interaction system 100 applies similarity metrics by measuring the cosine of the angle between two feature vectors. In some cases, the interaction system 100 calculates the sum of the absolute differences between the feature vector components. In some cases, the interaction system 100 measures the distance between two points while considering the correlation between variables, making it more suitable for high-dimensional data.

An input media content item can be identified as similar to a media content item that is of a different type based on the feature vectors. A video can be identified as similar to the image by processing the video and image through machine learning models to generate feature vectors, which can then be compared.

The interaction system 100 matches videos for similarity based on an input video using feature extraction and nearest neighbor algorithms that involve analyzing and comparing both visual and auditory content of different videos. In some cases, the videos are compared on a frame-by-frame basis.

The interaction system 100 applies a machine learning algorithm to extract features from video to identify the visual aspects, such as object shapes, textures, and motion patterns, which represent the content of the video. The interaction system 100 applies the same or a separate machine learning algorithm to extract auditory aspects, such as pitch, timbre, and rhythm, which represent the content of the audio.

The interaction system 100 can apply the machine learning algorithm to identify certain aspects of the audio data. The machine learning algorithm can identify speed or pace at which the music is played, such as in beats per minute (BPM). The machine learning algorithm can identify the pattern of beats and accents in a song, sequence of pitches and notes that form the main theme or tune of a song, harmony created by chords and chord progressions that support the melody, unique sound quality of different instruments and voices, variations in volume or intensity of the music, the tonal center or scale used in a piece of music, style or category of music, the words or text of a song, the arrangement of different sections in a song, the overall feeling or atmosphere conveyed by the music, and/or the like.

In some instances, the interaction system 100 identifies a song that is playing in the video. The machine learning algorithm identifies a song from a video using audio fingerprinting or audio recognition techniques. The machine learning algorithm analyzes the audio signal and extracts distinctive features, such as spectral patterns, tempo, pitch, and timbre. The machine learning algorithm creates a compact representation of the extracted features and searches a large database of known audio fingerprints for a match. If a match is found, the machine learning model can identify the corresponding song played in the audio or video.

Once the song is identified, the machine learning algorithm and/or the interaction system 100 accesses additional information about the song, such as the name of the song, the performer or band who recorded the song, the album or collection the song belongs to, the date when the song was first released, the musical style or category of the song, and/or the like.

The machine learning algorithm can use the various features identified in the audio and video data to identify other similar media content items, such as by using a Euclidean distance, cosine similarity, or Manhattan distance.

At operation 506, the interaction system 100 labels the training content, such as labeling the recent post of an image 516 of the black cat with the label 520 "black cat, centered, standing pose," and/or labeling the similar training content found at operation 504, such as image 518c tagged with the label 522 "black cat, sitting." Automatically labeling training data is crucial when dealing with large volumes of data, such as posts, videos, images, or content augmentations from users on the interaction system 100.

The interaction system 100 applies a variety of techniques to generate labels for training machine learning models. In some cases, the interaction system 100 applies a set of rules or heuristics based on domain knowledge to automatically assign labels to the data. For example, if a post contains specific keywords or phrases, the post is labeled as belonging to a certain category. In some cases, the interaction system 100 uses a predefined list of keywords or phrases, and labels can be assigned to the data based on the presence or frequency of these keywords in the content.

Human judgment is often subjective, which can lead to inconsistent results, particularly when multiple individuals are involved in the model development process, which is often the case for training data labeling. Manual labeling of training data can lead to inconsistencies due to human error or differences in interpretation. As such, example interaction systems described herein advantageously improve on these manual processes and provide consistency with results.

In some cases, the interaction system 100 applies weak supervision by leveraging noisy or less accurate labels from multiple sources to create a more accurate label. These sources can include rule-based systems, crowd-sourced annotations, or other existing models.

In some cases, the interaction system 100 applies semi-supervised learning by using a small set of labeled data along with a larger set of unlabeled data to train a model. The model is first trained on the labeled data and then used to predict labels for the unlabeled data. These predicted labels can be used to retrain the model iteratively, improving the model's performance and generating better labels for the data.

In some cases, the interaction system 100 applies transfer learning by using pre-trained models, such as models trained on large-scale datasets, to extract features or generate labels for the target data. For example, a pre-trained image classifier or natural language processing model can be fine-tuned on a smaller labeled dataset and used to generate labels for the remaining data.

In some cases, the interaction system 100 applies active learning by iteratively selecting the most informative or uncertain examples from the unlabeled data and queries an expert or oracle (e.g., a human annotator) for the correct labels. The interaction system 100 then updates the model with the new labeled data, and the process continues until a desired level of performance is achieved.

At operation 508, the interaction system 100 manages the training dataset. In some cases, the interaction system 100 preprocesses the training data by cleaning and transforming the data to make it suitable for use in training. The interaction system 100 preprocesses the data by handling missing values (e.g., imputation, deletion), normalizing and standardizing data, removing duplicates and outliers, encoding categorical variables, and/or the like.

In some cases, the interaction system 100 splits the training dataset. To properly evaluate the model's performance, the interaction system 100 splits the dataset into training, validation, and test sets. The training set is used to train the model, the validation set is used for hyperparameter tuning and model selection, and the test set is used for final evaluation. In some cases, the interaction system 100 augments the training data to create new training examples by applying various transformations to the existing data.

At operation 510, the interaction system 100 trains and evaluates the machine learning model. The interaction system 100 trains a machine learning model using a set of input-output pairs (called the training dataset) to teach the model to recognize patterns and make predictions or decisions. Then, the interaction system 100 evaluates the machine learning model by assessing its performance on unseen data (the test dataset) to estimate its ability to generalize to real-world situations.

The interaction system 100 separates the complete training dataset 602 into a model training dataset 606 used to train the model 610 and a model testing dataset 608 used to evaluate the model 612.

The interaction system 100 manages model versions 512 through each iteration of machine learning model training. Managing model versions is essential when continuously retraining a machine learning model to find similar media content items. The interaction system 100 implements a systematic approach to versioning to keep track of changes, compare model performance, and roll back to previous versions if needed. The interaction system 100 employs a version control system to track changes and configuration files, which provides a history of changes thereby making it easy to revert to a previous version if necessary.

For example, the interaction system 100 collects new user data at operation 614 and identifies whether sufficient new user data has been collected. In some examples, the retraining of the machine learning model occurs based on a time period. New user data is collected from March 2023 to April 2023 to retrain the model. Then in May of 2023, the time window 514 is reset to April 2023 to May 2023. New user data is collected between the new time window of April 2023 to May 2023 and the machine learning model is retrained.

Figure 7:
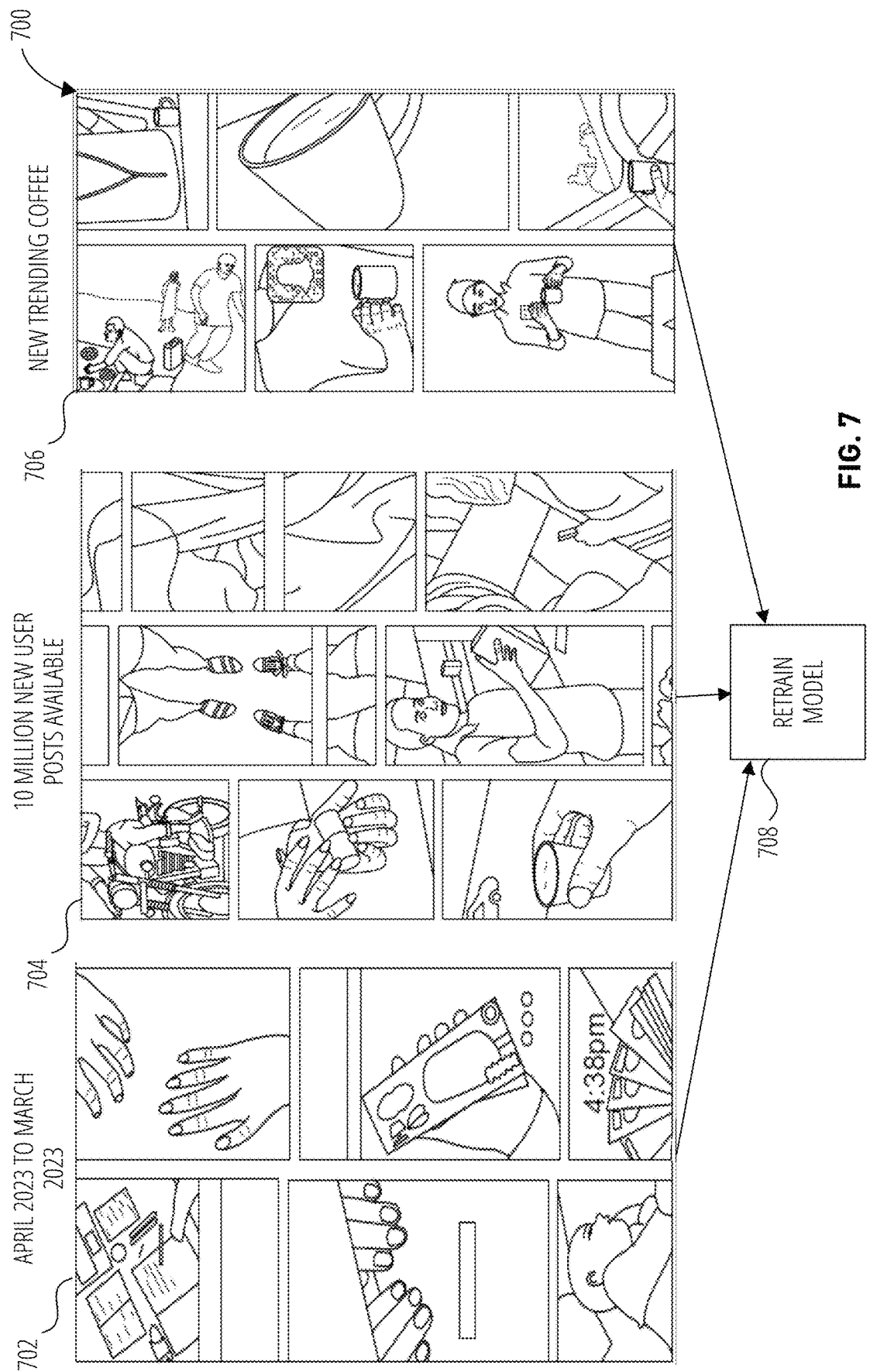
FIG. 7 illustrates criteria to initiate retraining of a machine learning model, according to some examples.

FIG. 7 illustrates criteria to initiate retraining of a machine learning model 700, according to some examples. Certain criteria can be used by the interaction system 100 to initiate the retraining of a machine learning model to ensure the model remains up-to-date and effective in identifying similar media content items (such as posts or augmentations). The interaction system 100 retrains the model on a fixed time interval, such as on a cadence, weekly, monthly, annually, and/or the like ensuring that the model stays up-to-date with the latest trends and content. This periodic retraining helps the model adapt to gradual changes in user behavior and preferences, thereby keeping its performance at an optimal level. To implement this criterion, the interaction system 100 schedules a retraining process to run automatically (such as every month) using task schedulers. In the example of FIG. 7, the interaction system 100 collects new content media items 702 from April 2023 to March 2023 to retrain the machine learning model 708.

In some examples, the interaction system 100 retrains the model when a certain amount of new data is collected (in the case of FIG. 7, 10 million new user posts 704, which ensures that the model is updated with a significant amount of fresh information). This data-driven approach ensures that the model is retrained when there is enough new data to make a meaningful impact on the understanding of content and changing user behavior. To implement this criterion, the interaction system 100 monitors the number of new media content items collected and triggers the retraining process once the threshold is reached.

In some examples, the interaction system 100 retrains the model when a new trending topic (e.g., a new coffee 706) gains popularity. Media content items can change rapidly due to emerging trends or viral topics, and as such, it is important to retrain the model to recognize and understand the related content. Retraining the model with data relevant to the trending topic ensures the model remains effective in identifying similar media content items in the context of this new trend. To implement this criterion, the interaction system 100 monitors interaction activity on the platform for trending topics using keyword tracking or topic modeling techniques and triggers the retraining process when a new trend is detected.

In some examples, the interaction system 100 identifies new trending topics based on keyword tracking (such as posts, comments, or hashtags to specific phrases rapidly gaining popularity and/or use over a certain period of time), topic modeling on textual data (e.g., modeling that is trained to discover latent topics within media content items such as text, video, or audio), news or media monitoring (to identify frequency and velocity of content creation and postings), external data sources that gather information on emerging trends, and/or user behavior (such as click-through rates, browsing patterns, user preferences).

In some examples, the interaction system 100 initiates retraining of the model based on regular evaluation the model's performance metrics. If these metrics drop below a predetermined threshold, the interaction system 100 may initiate retraining to reverse the model's performance degradation.

In some examples, the interaction system 100 monitors the difference between the distributions of the training data and the real-world data the model encounters. If a threshold divergence is detected, the interaction system 100 can initiate retraining to fix the drift away of the model from the underlying data distribution.

In some examples, the interaction system 100 track user engagement metrics, such as click-through rates, likes, shares, and time spent on the platform. If these metrics change to a certain degree, the interaction system 100 can initiate training to meet shifting user behavior or preferences.

In some examples, the interaction system 100 initiates retraining of the model based on new trends, topics, and memes which can emerging frequently. The interaction system 100 tracks the prevalence of popular topics and keywords to identify shifts in content trends and retrain the model to stay current with these changes.

In some examples, the interaction system 100 monitors the impact of changes in platform features, algorithms, or policies on user behavior and data patterns. If a threshold number of changes are observed, the interaction system retrains the model to ensure the model remains in tune with the updated platform environment.

In some examples, the interaction system 100 initiates retraining of the model based on collected user feedback, such as reports of false positives/negatives, spam, or inappropriate content. If there's a threshold amount of increase in negative feedback or a change in the nature of the feedback, the interaction system 100 initiates retraining of the model.

In some examples, the interaction system 100 initiates retraining based on performance metrics of the machine learning models. If there is a noticeable decline in metrics such as a threshold difference in accuracy, precision, recall, or user satisfaction measures, the interaction system 100 initiates retraining of the models.

In some examples, the interaction system 100 initiates retraining based on a newly available data source, such as a new API that provides access to new data for the platform that was not previously available.

In some examples, the interaction system 100 initiates retraining based on certain updates or changes to the platform (such as significant updates to the user interface, functionality, or algorithms). Such updates or changes can impact the performance of the machine learning models. Retraining the models help align the models with the updated platform environment and ensure the models continue to provide relevant and useful predictions.

Data Communications Architecture

Figure 8:
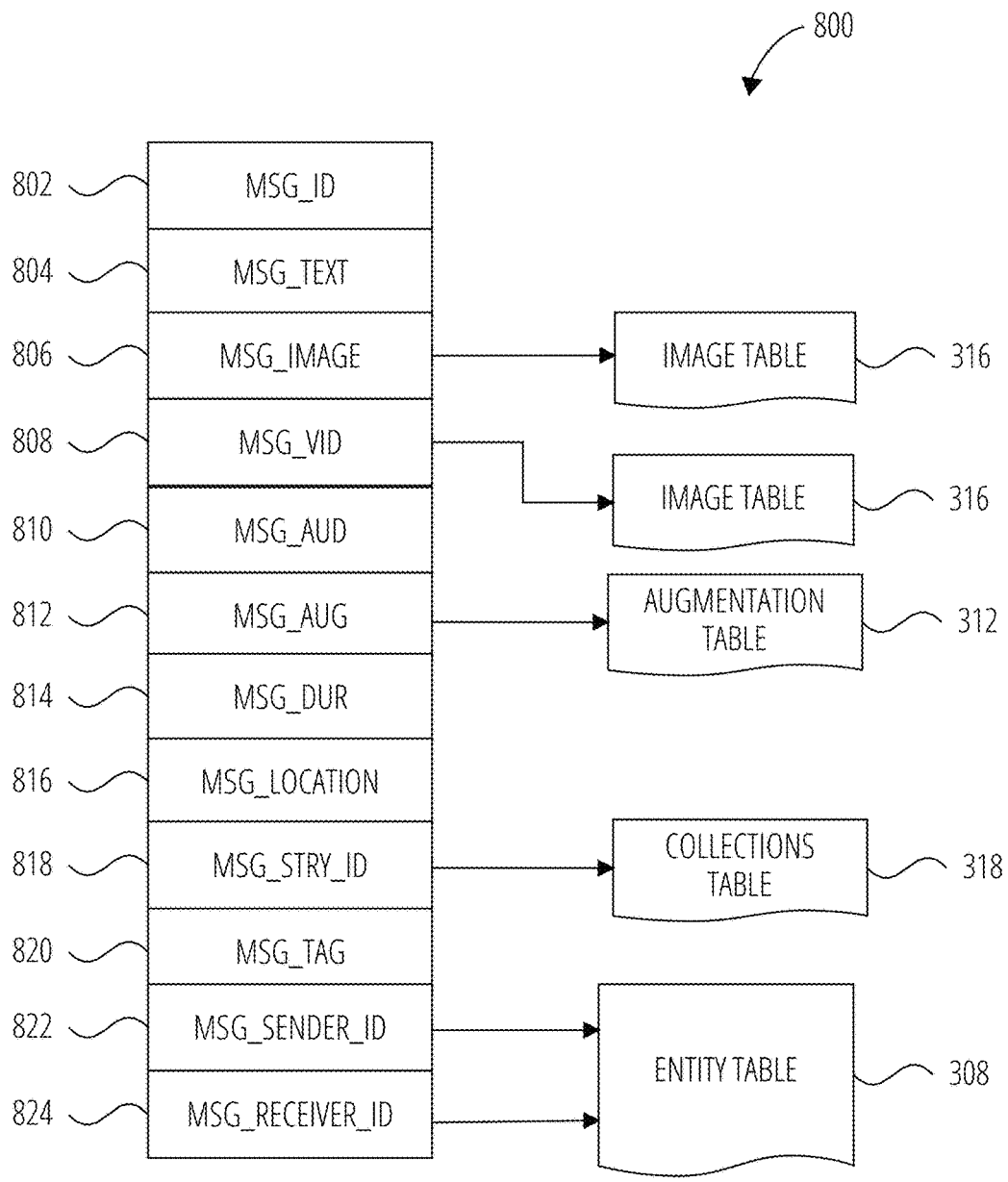
FIG. 8 is a diagrammatic representation of a message, according to some examples.

FIG. 8 is a schematic diagram illustrating a structure of a message 800, according to some examples, generated by an interaction client 104 for communication to a further interaction client 104 via the interaction servers 124. The content of a particular message 800 is used to populate the message table 306 stored within the database 304, accessible by the interaction servers 124. Similarly, the content of a message 800 is stored in memory as "in-transit" or "in-flight" data of the user system 102 or the interaction servers 124. A message 800 is shown to include the following example components:

Message identifier 802: a unique identifier that identifies the message 800.

Message text payload 804: text, to be generated by a user via a user interface of the user system 102, and that is included in the message 800.

Message image payload 806: image data, captured by a camera component of a user system 102 or retrieved from a memory component of a user system 102, and that is included in the message 800. Image data for a sent or received message 800 may be stored in the image table 316.

Message video payload 808: video data, captured by a camera component or retrieved from a memory component of the user system 102, and that is included in the message 800. Video data for a sent or received message 800 may be stored in the image table 316.

Message audio payload 810: audio data, captured by a microphone or retrieved from a memory component of the user system 102, and that is included in the message 800.

Message augmentation data 812: augmentation data (e.g., filters, stickers, or other annotations or enhancements) that represents augmentations to be applied to message image payload 806, message video payload 808, or message audio payload 810 of the message 800. Augmentation data for a sent or received message 800 may be stored in the augmentation table 312.

Message duration parameter 814: parameter value indicating, in seconds, the amount of time for which content of the message (e.g., the message image payload 806, message video payload 808, message audio payload 810) is to be presented or made accessible to a user via the interaction client 104.

Message geolocation parameter 816: geolocation data (e.g., latitudinal and longitudinal coordinates) associated with the content payload of the message. Multiple message geolocation parameter 816 values may be included in the payload, each of these parameter values being associated with respect to content items included in the content (e.g., a specific image within the message image payload 806, or a specific video in the message video payload 808).

Message story identifier 818: identifier values identifying one or more content collections (e.g., "stories" identified in the collections table 318) with which a particular content item in the message image payload 806 of the message 800 is associated. For example, multiple images within the message image payload 806 may each be associated with multiple content collections using identifier values.

Message tag 820: each message 800 may be tagged with multiple tags, each of which is indicative of the subject matter of content included in the message payload. For example, where a particular image included in the message image payload 806 depicts an animal (e.g., a lion), a tag value may be included within the message tag 820 that is indicative of the relevant animal. Tag values may be generated manually, based on user input, or may be automatically generated using, for example, image recognition.

Message sender identifier 822: an identifier (e.g., a messaging system identifier, email address, or device identifier) indicative of a user of the user system 102 on which the message 800 was generated and from which the message 800 was sent.

Message receiver identifier 824: an identifier (e.g., a messaging system identifier, email address, or device identifier) indicative of a user of the user system 102 to which the message 800 is addressed.

The contents (e.g., values) of the various components of message 800 may be pointers to locations in tables within which content data values are stored. For example, an image value in the message image payload 806 may be a pointer to (or address of) a location within an image table 316. Similarly, values within the message video payload 808 may point to data stored within an image or video table 316, values stored within the message augmentation data 812 may point to data stored in an augmentation table 312, values stored within the message story identifier 818 may point to data stored in a collections table 318, and values stored within the message sender identifier 822 and the message receiver identifier 824 may point to user records stored within an entity table 308.

Machine Architecture

Figure 9:
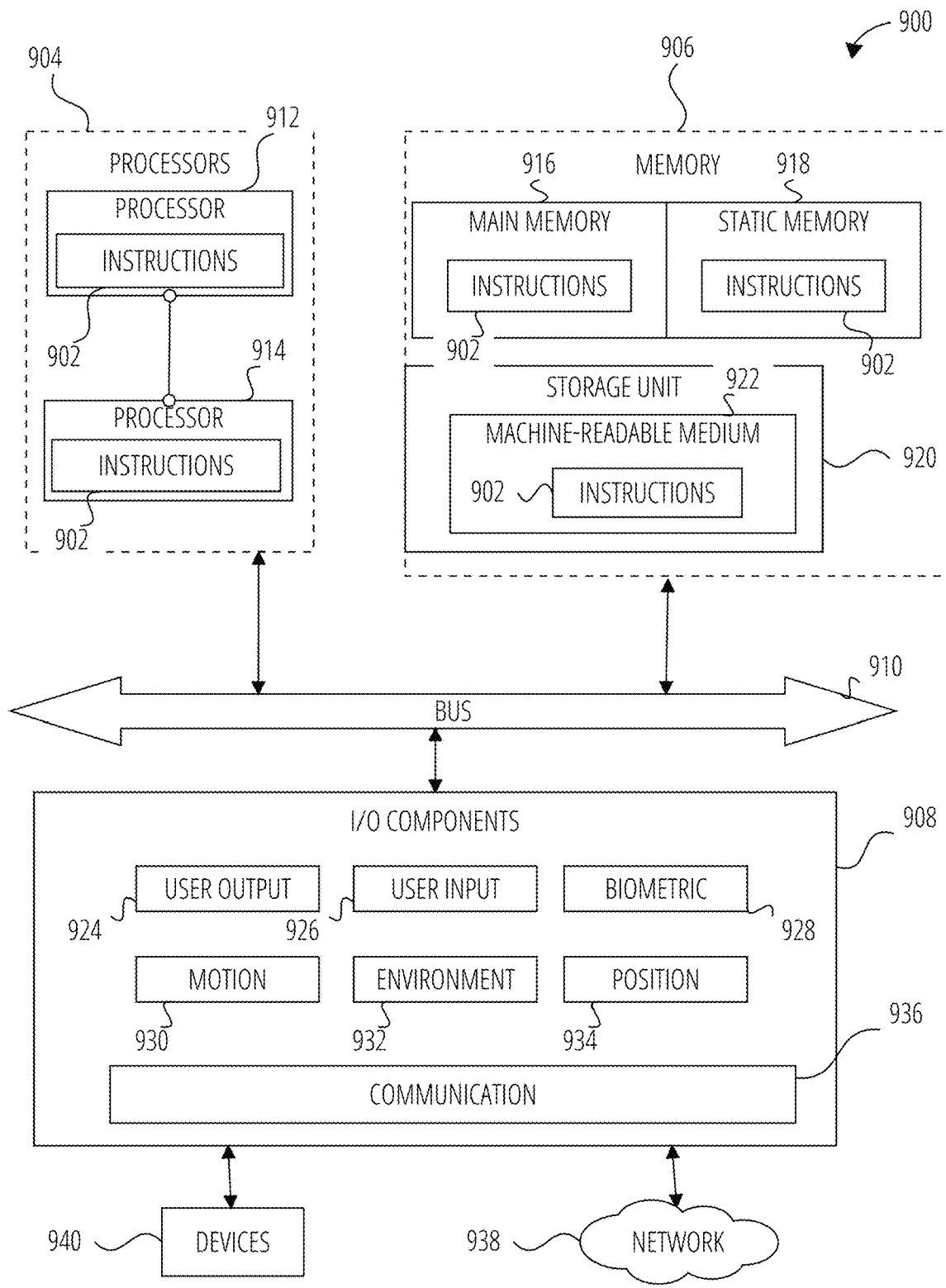
FIG. 9 is a diagrammatic representation of a machine in the form of a computer system within which a set of instructions may be executed to cause the machine to perform any one or more of the methodologies discussed herein, according to some examples.

FIG. 9 is a diagrammatic representation of the machine 900 within which instructions 902 (e.g., software, a program, an application, an applet, an app, or other executable code) for causing the machine 900 to perform any one or more of the methodologies discussed herein may be executed. For example, the instructions 902 may cause the machine 900 to execute any one or more of the methods described herein. The instructions 902 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 902, sequentially or otherwise, that specify actions to be taken by the machine 900. Further, while a single machine 900 is illustrated, the term "machine" shall also be taken to include a collection of machines that individually or jointly execute the instructions 902 to perform any one or more of the methodologies discussed herein. The machine 900, for example, may comprise the user system 102 or any one of multiple server devices forming part of the interaction server system 110. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 908, which may be configured to communicate with each other via a bus 910. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 912 and a processor 914 that execute the instructions 902. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 916, a static memory 918, and a storage unit 920, both accessible to the processors 904 via the bus 910. The main memory 906, the static memory 918, and storage unit 920 store the instructions 902 embodying any one or more of the methodologies or functions described herein. The instructions 902 may also reside, completely or partially, within the main memory 916, within the static memory 918, within machine-readable medium 922 within the storage unit 920, within at least one of the processors 904 (e.g., within the processor's cache memory), or any suitable combination thereof, during execution thereof by the machine 900.

The I/O components 908 may include a wide variety of components to receive input, provide output, produce output, transmit information, exchange information, capture measurements, and so on. The specific I/O components 908 that are included in a particular machine will depend on the type of machine. For example, portable machines such as mobile phones may include a touch input device or other such input mechanisms, while a headless server machine will likely not include such a touch input device. It will be appreciated that the I/O components 908 may include many other components that are not shown in FIG. 9. In various examples, the I/O components 908 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 908 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like.

The motion components 930 include acceleration sensor components (e.g., accelerometer), gravitation sensor components, and rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 908 further include communication components 936 operable to couple the machine 900 to a network 938 or devices 940 via respective coupling or connections. For example, the communication components 936 may include a network interface component or another suitable device to interface with the network 938. In further examples, the communication components 936 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 940 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™ MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 916, static memory 918, and memory of the processors 904) and storage unit 920 may store one or more sets of instructions and data structures (e.g., software) embodying or used by any one or more of the methodologies or functions described herein. These instructions (e.g., the instructions 902), when executed by processors 904, cause various operations to implement the disclosed examples.

The instructions 902 may be transmitted or received over the network 938, using a transmission medium, via a network interface device (e.g., a network interface component included in the communication components 936) and using any one of several well-known transfer protocols (e.g., hypertext transfer protocol (HTTP)). Similarly, the instructions 902 may be transmitted or received using a transmission medium via a coupling (e.g., a peer-to-peer coupling) to the devices 940.

Software Architecture

Figure 10:
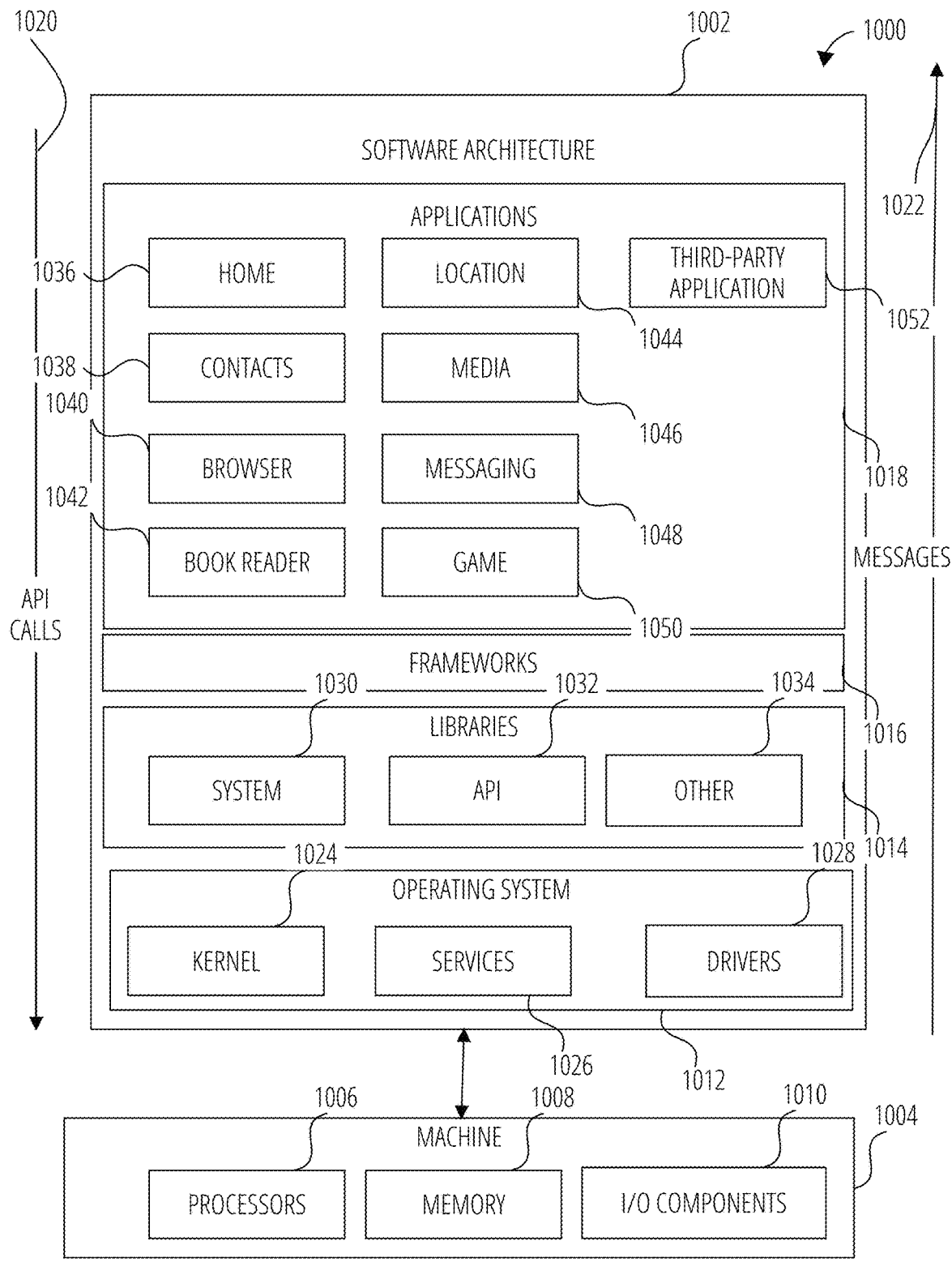
FIG. 10 is a block diagram showing a software architecture within which examples may be implemented.

FIG. 10 is a block diagram 1000 illustrating a software architecture 1002, which can be installed on any one or more of the devices described herein. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such as an operating system 1012, libraries 1014, frameworks 1016, and applications 1018. Operationally, the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 provides memory management, processor management (e.g., scheduling), component management, networking, and security settings, among other functionalities. The services 1026 can provide other common services for the other software layers. The drivers 1028 are responsible for controlling or interfacing with the underlying hardware. For instance, the drivers 1028 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1014 provide a common low-level infrastructure used by the applications 1018. The libraries 1014 can include system libraries 1030 (e.g., C standard library) that provide functions such as memory allocation functions, string manipulation functions, mathematic functions, and the like. In addition, the libraries 1014 can include API libraries 1032 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1014 can also include a wide variety of other libraries 1034 to provide many other APIs to the applications 1018.

The frameworks 1016 provide a common high-level infrastructure that is used by the applications 1018. For example, the frameworks 1016 provide various graphical user interface (GUI) functions, high-level resource management, and high-level location services. The frameworks 1016 can provide a broad spectrum of other APIs that can be used by the applications 1018, some of which may be specific to a particular operating system or platform.

In an example, the applications 1018 may include a home application 1036, a contacts application 1038, a browser application 1040, a book reader application 1042, a location application 1044, a media application 1046, a messaging application 1048, a game application 1050, and a broad assortment of other applications such as a third-party application 1052. The applications 1018 are programs that execute functions defined in the programs. Various programming languages can be employed to create one or more of the applications 1018, structured in a variety of manners, such as object-oriented programming languages (e.g., Objective-C, Java, or C++) or procedural programming languages (e.g., C or assembly language). In a specific example, the third-party application 1052 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1052 can invoke the API calls 1020 provided by the operating system 1012 to facilitate functionalities described herein.

Machine-Learning Pipeline

Figure 12:
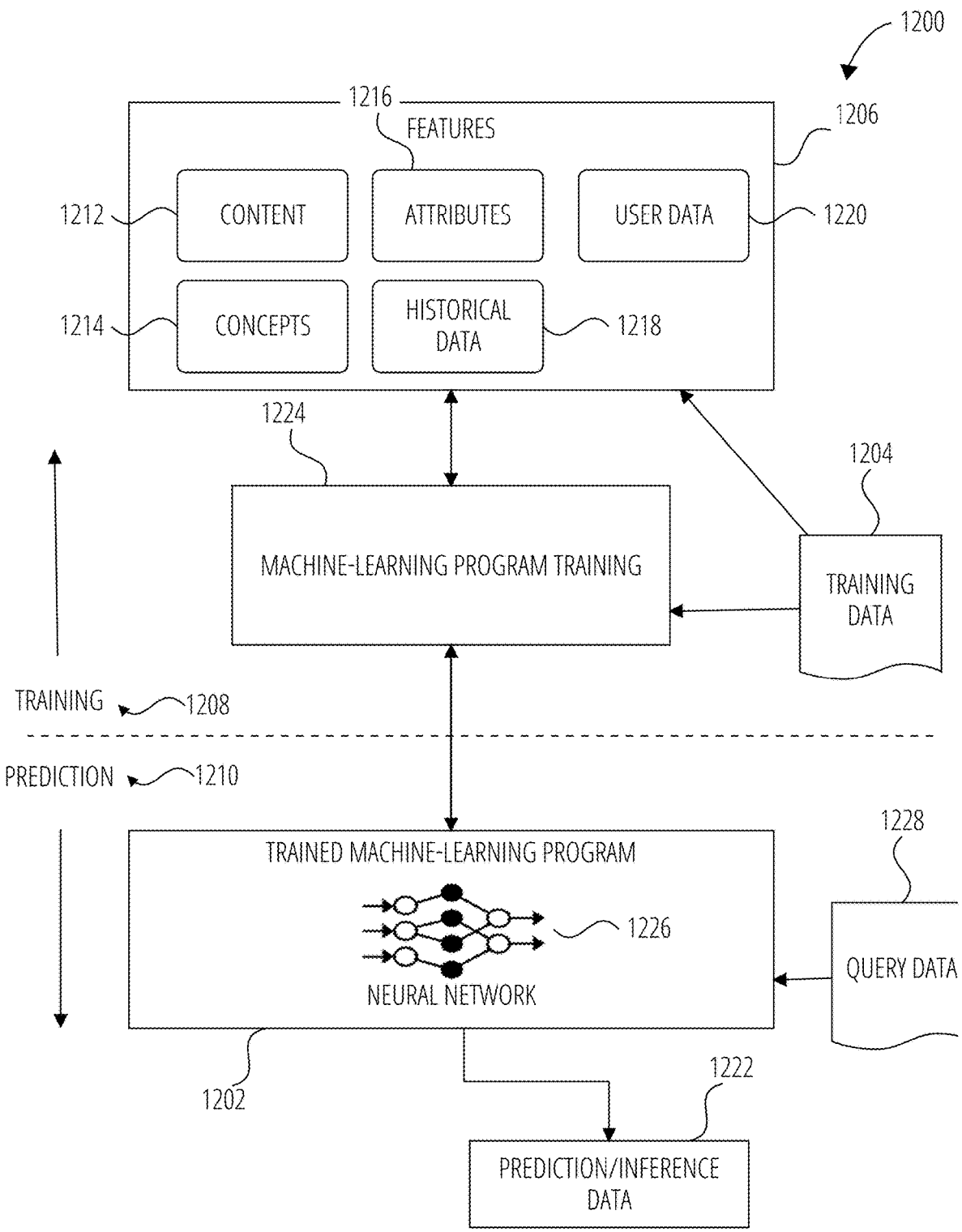
FIG. 12 illustrates training and use of a machine-learning program, according to some examples.

FIG. 12 is a flowchart depicting a machine-learning pipeline 1200, according to some examples. The machine-learning pipelines 1200 may be used to generate a trained model, for example the trained machine-learning program 1202 of FIG. 12, described herein to perform operations associated with searches and query responses.

Overview

Broadly, machine learning may involve using computer algorithms to automatically learn patterns and relationships in data, potentially without the need for explicit programming to do so after the algorithm is trained. Examples of machine learning algorithms can be divided into three main categories: supervised learning, unsupervised learning, and reinforcement learning.

Supervised learning involves training a model using labeled data to predict an output for new, unseen inputs. Examples of supervised learning algorithms include linear regression, decision trees, and neural networks.

Unsupervised learning involves training a model on unlabeled data to find hidden patterns and relationships in the data. Examples of unsupervised learning algorithms include clustering, principal component analysis, and generative models like autoencoders.

Reinforcement learning involves training a model to make decisions in a dynamic environment by receiving feedback in the form of rewards or penalties. Examples of reinforcement learning algorithms include Q-learning and policy gradient methods.

Examples of specific machine learning algorithms that may be deployed, according to some examples, include logistic regression, which is a type of supervised learning algorithm used for binary classification tasks. Logistic regression models the probability of a binary response variable based on one or more predictor variables. Another example type of machine learning algorithm is Naïve Bayes, which is another supervised learning algorithm used for classification tasks. Naïve Bayes is based on Bayes' theorem and assumes that the predictor variables are independent of each other. Random Forest is another type of supervised learning algorithm used for classification, regression, and other tasks. Random Forest builds a collection of decision trees and combines their outputs to make predictions. Further examples include neural networks which consist of interconnected layers of nodes (or neurons) that process information and make predictions based on the input data. Matrix factorization is another type of machine learning algorithm used for recommender systems and other tasks. Matrix factorization decomposes a matrix into two or more matrices to uncover hidden patterns or relationships in the data. Support Vector Machines (SVM) are a type of supervised learning algorithm used for classification, regression, and other tasks. SVM finds a hyperplane that separates the different classes in the data. Other types of machine learning algorithms include decision trees, k-nearest neighbors, clustering algorithms, and deep learning algorithms such as convolutional neural networks (CNN), recurrent neural networks (RNN), and transformer models. The choice of algorithm depends on the nature of the data, the complexity of the problem, and the performance requirements of the application.

The performance of machine learning models is typically evaluated on a separate test set of data that was not used during training to ensure that the model can generalize to new, unseen data. Evaluating the model on a separate test set helps to mitigate the risk of overfitting, a common issue in machine learning where a model learns to perform exceptionally well on the training data but fails to maintain that performance on data it hasn't encountered before. By using a test set, the system obtains a more reliable estimate of the model's real-world performance and its potential effectiveness when deployed in practical applications.

Although several specific examples of machine learning algorithms are discussed herein, the principles discussed herein can be applied to other machine learning algorithms as well. Deep learning algorithms such as convolutional neural networks, recurrent neural networks, and transformers, as well as more traditional machine learning algorithms like decision trees, random forests, and gradient boosting may be used in various machine learning applications.

Two example types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

Phases

Figure 11:
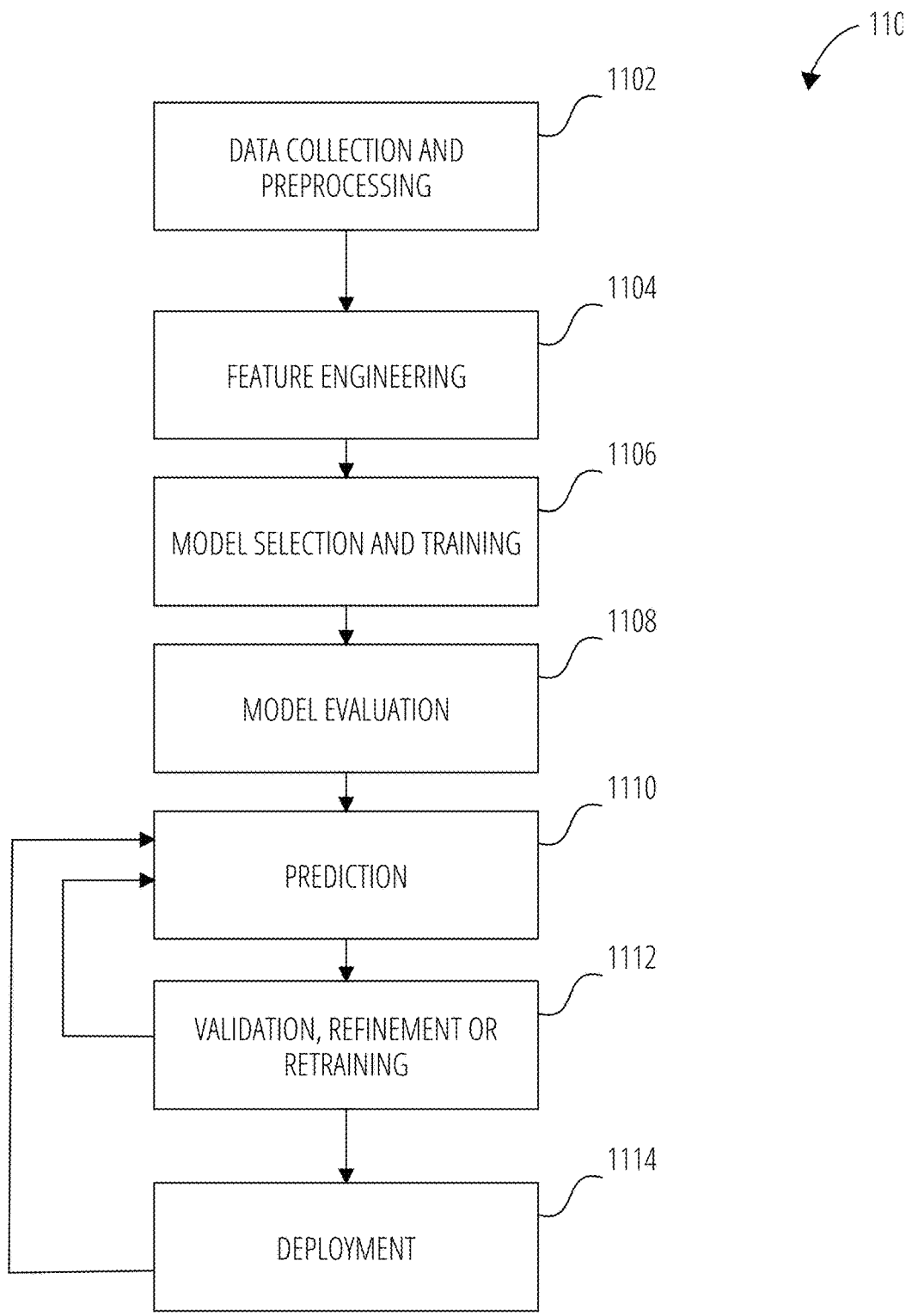
FIG. 11 illustrates a machine-learning pipeline, according to some examples.

Generating a trained machine-learning program 1202 may include multiple types of phases that form part of the machine-learning pipeline 1200, including for example the following phases 1100 illustrated in FIG. 11:

Data collection and preprocessing 1102: This may include acquiring and cleaning data to ensure that it is suitable for use in the machine learning model. Data can be gathered from user content creation and labeled using a machine learning algorithm trained to label data. Data can be generated by applying a machine learning algorithm to identify or generate similar data. This may also include removing duplicates, handling missing values, and converting data into a suitable format.

Feature engineering 1104: This may include selecting and transforming the training data 1204 to create features that are useful for predicting the target variable. Feature engineering may include (1) receiving features 1206 (e.g., as structured or labeled data in supervised learning) and/or (2) identifying features 1206 (e.g., unstructured or unlabeled data for unsupervised learning) in training data 1204.

Model selection and training 1106: This may include specifying a particular problem or desired response from input data, selecting an appropriate machine learning algorithm, and training it on the preprocessed data. This may further involve splitting the data into training and testing sets, using cross-validation to evaluate the model, and tuning hyperparameters to improve performance. Model selection can be based on factors such as the type of data, problem complexity, computational resources, or desired performance.

Model evaluation 1108: This may include evaluating the performance of a trained model (e.g., the trained machine-learning program 1202) on a separate testing dataset. This can help determine if the model is overfitting or underfitting and if it is suitable for deployment.

Prediction 1110: This involves using a trained model (e.g., trained machine-learning program 1202) to generate predictions on new, unseen data.

Validation, refinement or retraining 1112: This may include updating a model based on feedback generated from the prediction phase, such as new data or user feedback.

Deployment 1114: This may include integrating the trained model (e.g., the trained machine-learning program 1202) into a larger system or application, such as a web service, mobile app, or IoT device. This can involve setting up APIs, building a user interface, and ensuring that the model is scalable and can handle large volumes of data.

FIG. 12 illustrates two example phases, namely a training phase 1208 (part of the model selection and trainings 1106) and a prediction phase 1210 (part of prediction 1110). Prior to the training phase 1208, feature engineering 1104 is used to identify features 1206. This may include identifying informative, discriminating, and independent features for the effective operation of the trained machine-learning program 1202 in pattern recognition, classification, and regression. In some examples, the training data 1204 includes labeled data, which is known data for pre-identified features 1206 and one or more outcomes.

Each of the features 1206 may be a variable or attribute, such as individual measurable property of a process, article, system, or phenomenon represented by a data set (e.g., the training data 1204). Features 1206 may also be of different types, such as numeric features, strings, vectors, matrices, encodings, and graphs, and may include one or more of content 1212, concepts 1214, attributes 1216, historical data 1218 and/or user data 1220, merely for example. Concept features can include abstract relationships or patterns in data, such as determining a topic of a document or discussion in a chat window between users. Content features include determining a context based on input information, such as determining a context of a user based on user interactions or surrounding environmental factors. Context features can include text features, such as frequency or preference of words or phrases, image features, such as pixels, textures, or pattern recognition, audio classification, such as spectrograms, and/or the like. Attribute features include intrinsic attributes (directly observable) or extrinsic features (derived), such as identifying square footage, location, or age of a real estate property identified in a camera feed. User data features include data pertaining to a particular individual or to a group of individuals, such as in a geographical location or that share demographic characteristics. User data can include demographic data (such as age, gender, location, or occupation), user behavior (such as browsing history, purchase history, conversion rates, click-through rates, or engagement metrics), or user preferences (such as preferences to certain video, text, or digital content items). Historical data includes past events or trends that can help identify patterns or relationships over time.

In training phases 1208, the machine-learning pipeline 1200 uses the training data 1204 to find correlations among the features 1206 that affect a predicted outcome or prediction/inference data 1222.

With the training data 1204 and the identified features 1206, the trained machine-learning program 1202 is trained during the training phase 1208 during machine-learning program training 1224. The machine-learning program training 1224 appraises values of the features 1206 as they correlate to the training data 1204. The result of the training is the trained machine-learning program 1202 (e.g., a trained or learned model).

Further, the training phase 1208 may involve machine learning, in which the training data 1204 is structured (e.g., labeled during preprocessing operations), and the trained machine-learning program 1202 implements a relatively simple neural network 1226 capable of performing, for example, classification and clustering operations. In other examples, the training phase 1208 may involve deep learning, in which the training data 1204 is unstructured, and the trained machine-learning program 1202 implements a deep neural network 1226 that is able to perform both feature extraction and classification/clustering operations.

A neural network 1226 may, in some examples, be generated during the training phase 1208, and implemented within the trained machine-learning program 1202. The neural network 1226 includes a hierarchical (e.g., layered) organization of neurons, with each layer including multiple neurons or nodes. Neurons in the input layer receive the input data, while neurons in the output layer produce the final output of the network. Between the input and output layers, there may be one or more hidden layers, each including multiple neurons.

Each neuron in the neural network 1226 operationally computes a small function, such as an activation function that takes as input the weighted sum of the outputs of the neurons in the previous layer, as well as a bias term. The output of this function is then passed as input to the neurons in the next layer. If the output of the activation function exceeds a certain threshold, an output is communicated from that neuron (e.g., transmitting neuron) to a connected neuron (e.g., receiving neuron) in successive layers. The connections between neurons have associated weights, which define the influence of the input from a transmitting neuron to a receiving neuron. During the training phase, these weights are adjusted by the learning algorithm to optimize the performance of the network. Different types of neural networks may use different activation functions and learning algorithms, which can affect their performance on different tasks. Overall, the layered organization of neurons and the use of activation functions and weights enable neural networks to model complex relationships between inputs and outputs, and to generalize to new inputs that were not seen during training.

In some examples, the neural network 1226 may also be one of a number of different types of neural networks or a combination thereof, such as a single-layer feed-forward network, a Multilayer Perceptron (MLP), an Artificial Neural Network (ANN), a Recurrent Neural Network (RNN), a Long Short-Term Memory Network (LSTM), a Bidirectional Neural Network, a symmetrically connected neural network, a Deep Belief Network (DBN), a Convolutional Neural Network (CNN), a Generative Adversarial Network (GAN), an Autoencoder Neural Network (AE), a Restricted Boltzmann Machine (RBM), a Hopfield Network, a Self-Organizing Map (SOM), a Radial Basis Function Network (RBFN), a Spiking Neural Network (SNN), a Liquid State Machine (LSM), an Echo State Network (ESN), a Neural Turing Machine (NTM), or a Transformer Network, merely for example.

In addition to the training phase 1208, a validation phase may be performed evaluated on a separate dataset known as the validation dataset. The validation dataset is used to tune the hyperparameters of a model, such as the learning rate and the regularization parameter. The hyperparameters are adjusted to improve the performance of the model on the validation dataset.

The neural network 1226 is iteratively trained by adjusting model parameters to minimize a specific loss function or maximize a certain objective. The system can continue to train the neural network 1226 by adjusting parameters based on the output of the validation, refinement, or retraining block 1112, and rerun the prediction 1110 on new or already run training data. The system can employ optimization techniques for these adjustments such as gradient descent algorithms, momentum algorithms, Nesterov Accelerated Gradient (NAG) algorithm, and/or the like. The system can continue to iteratively train the neural network 1226 even after deployment 1114 of the neural network 1226. The neural network 1226 can be continuously trained as new data emerges, such as based on user creation or system-generated training data.

Once a model is fully trained and validated, in a testing phase, the model may be tested on a new dataset that the model has not seen before. The testing dataset is used to evaluate the performance of the model and to ensure that the model has not overfit the training data.

In prediction phase 1210, the trained machine-learning program 1202 uses the features 1206 for analyzing query data 1228 to generate inferences, outcomes, or predictions, as examples of a prediction/inference data 1222. For example, during prediction phase 1210, the trained machine-learning program 1202 is used to generate an output. Query data 1228 is provided as an input to the trained machine-learning program 1202, and the trained machine-learning program 1202 generates the prediction/inference data 1222 as output, responsive to receipt of the query data 1228. Query data can include a prompt, such as a user entering a textual question or speaking a question audibly. In some cases, the system generates the query based on an Interaction function occurring in the system, such as a user interacting with a virtual object, a user sending another user a question in a chat window, or an object detected in a camera feed.

In some examples the trained machine-learning program 1202 may be a generative AI model. Generative AI is a term that may refer to any type of artificial intelligence that can create new content from training data 1204. For example, generative AI can produce text, images, video, audio, code or synthetic data that are similar to the original data but not identical.

Some of the techniques that may be used in generative AI are:

- Convolutional Neural Networks (CNNs): CNNs are commonly used for image recognition and computer vision tasks. They are designed to extract features from images by using filters or kernels that scan the input image and highlight important patterns. CNNs may be used in applications such as object detection, facial recognition, and autonomous driving.
- Recurrent Neural Networks (RNNs): RNNs are designed for processing sequential data, such as speech, text, and time series data. They have feedback loops that allow them to capture temporal dependencies and remember past inputs. RNNs may be used in applications such as speech recognition, machine translation, and sentiment analysis
- Generative adversarial networks (GANs): These are models that consist of two neural networks: a generator and a discriminator. The generator tries to create realistic content that can fool the discriminator, while the discriminator tries to distinguish between real and fake content. The two networks compete with each other and improve over time. GANs may be used in applications such as image synthesis, video prediction, and style transfer.
- Variational autoencoders (VAEs): These are models that encode input data into a latent space (a compressed representation) and then decode it back into output data. The latent space can be manipulated to generate new variations of the output data. They may use self-attention mechanisms to process input data, allowing them to handle long sequences of text and capture complex dependencies.

Transformer models: These are models that use attention mechanisms to learn the relationships between different parts of input data (such as words or pixels) and generate output data based on these relationships. Transformer models can handle sequential data such as text or speech as well as non-sequential data such as images or code.

In generative AI examples, the prediction/inference data 1222 that is output include trend assessment and predictions, translations, summaries, image or video recognition and categorization, natural language processing, face recognition, user sentiment assessments, advertisement targeting and optimization, voice recognition, or media content generation, recommendation, and personalization.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a system comprising: at least one processor; at least one memory component storing instructions that, when executed by the at least one processor, cause the at least one processor to perform operations comprising: training a machine learning model by performing a set of operations comprising: accessing media content items associated with interaction functions initiated by users of an interaction system, wherein the media content items comprise images, videos, or content augmentations of the users posted on the interaction system enabling other users to view the posted media content items; generating training data including labels for the media content items, wherein the labels are indicative of one or more characteristics of the media content items; extracting features from a media content item of the media content items; identifying additional media content items to include, in the training data based on the extracted features from the media content item; processing the training data using a machine learning model to generate a media content item output; and updating one or more parameters of the machine learning model based on the media content item output; and repeating the set of operations to retrain the machine learning model based on a retraining criterion being met.

In Example 2, the subject matter of Example 1 includes, wherein identifying additional media content items comprises applying a distance metric to compare the media content item and individual additional media content items in order to identify the additional media content items.

In Example 3, the subject matter of Example 2 includes, wherein extracting the features from the media content item comprises applying a machine learning model trained to extract features from one or more media content items.

In Example 4, the subject matter of Example 3 includes, wherein generating the training data comprises adding the one or more extracted features to the labels.

In Example 5, the subject matter of Examples 2-4 includes, wherein the media content items comprise videos created by users to share with other users, wherein the features are extracted on a frame-by-frame basis.

In Example 6, the subject matter of Examples 2-5 includes, wherein the media content items comprise content augmentations created by users to share with other users, wherein the extracted features include the augmentations that are applied to a camera feed in real-time.

In Example 7, the subject matter of Examples 2-6 includes, wherein at least some of the media content items are in a different format than the additional media content items.

In Example 8, the subject matter of Example 7 includes, wherein the media content items that are in the different format are compared with the additional media contents based on the extracted features.

In Example 9, the subject matter of Examples 1-8 includes, wherein the additional media content items were created by users in a different time period than when the accessed media content items were created.

In Example 10, the subject matter of Examples 1-9 includes, wherein the additional media content items were created by different users than the users that created the accessed media content items.

In Example 11, the subject matter of Examples 1-10 includes, wherein the additional media content items are identified based on metadata of the accessed media content items.

In Example 12, the subject matter of Example 11 includes, wherein the metadata comprises a location where a user created the individual media content item.

In Example 13, the subject matter of Examples 1-12 includes, wherein the retraining criterion comprises a keyword indicative of a trend, wherein the operations further comprise tracking the use of one or more keywords in media content items and the retraining criterion includes meeting a threshold number of uses of the keyword.

In Example 14, the subject matter of Examples 1-13 includes, wherein the media content items comprise images or videos, and the interaction functions comprise media content items created by users and shared with other users.

In Example 15, the subject matter of Example 14 includes, wherein the media content items that were created by users do not include labels for training the machine learning model, wherein generating the training data includes identifying keywords in captions of individual media content items or comments to the media content items from other users.

In Example 16, the subject matter of Examples 14-15 includes, wherein the media content items comprise content augmentations that add interactive digital elements in real-time to a camera feed.

In Example 17, the subject matter of Examples 1-16 includes, wherein the operations further comprise adding the training data to an existing set of training data, wherein repeating the set of operations further comprises adding newly accessed training data to the existing set of training data such that the existing set of training data increases in size with each repeating of the set of operations.

In Example 18, the subject matter of Example 17 includes, wherein processing the training data using the machine learning model to generate the media content item output further comprises processing the existing set of training data using the machine learning model.

Example 19 is a method comprising: training a machine learning model by performing a set of operations comprising: accessing media content items associated with interaction functions initiated by users of an interaction system, wherein the media content items comprise images, videos, or content augmentations of the users posted on the interaction system enabling other users to view the posted media content items; generating training data including labels for the media content items, wherein the labels are indicative of one or more characteristics of the media content items; extracting features from a media content item of the media content items; identifying additional media content items to include, in the training data based on the extracted features from the media content item; processing the training data using a machine learning model to generate a media content item output; and updating one or more parameters of the machine learning model based on the media content item output; and repeating the set of operations to retrain the machine learning model based on a retraining criterion being met.

Example 20 is a non-transitory computer-readable storage medium storing instructions that, when executed by at least one processor, cause the at least one processor to perform operations comprising: training a machine learning model by performing a set of operations comprising: accessing media content items associated with interaction functions initiated by users of an interaction system, wherein the media content items comprise images, videos, or content augmentations of the users posted on the interaction system enabling other users to view the posted media content items; generating training data including labels for the media content items, wherein the labels are indicative of one or more characteristics of the media content items; extracting features from a media content item of the media content items; identifying additional media content items to include, in the training data based on the extracted features from the media content item; processing the training data using a machine learning model to generate a media content item output; and updating one or more parameters of the machine learning model based on the media content item output; and repeating the set of operations to retrain the machine learning model based on a retraining criterion being met.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Glossary

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

CONCLUSION

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, and processes described herein may be used independently of one another, or may be combined in various ways. All possible combinations and subcombinations are intended to fall within the scope of this disclosure. In addition, certain method or process blocks may be omitted in some implementations.

What is claimed is:

1. A system comprising:
   at least one processor;
   at least one memory component storing instructions that, when executed by the at least one processor, cause the at least one processor to perform operations comprising:
   training a machine learning model by performing a set of operations comprising:
     accessing media content items associated with interaction functions initiated by users of an interaction system, wherein the media content items comprise images, videos, or content augmentations of the users posted on the interaction system enabling other users to view the posted media content items;
     generating training data including labels for the media content items, wherein the labels are indicative of one or more characteristics of the media content items;
     extracting features from a media content item of the media content items;
     identifying additional media content items to include in the training data based on the extracted features from the media content item;
     processing the training data using a machine learning model to generate a media content item output; and
     updating one or more parameters of the machine learning model based on the media content item output; and
   repeating the set of operations to retrain the machine learning model based on a retraining criterion being met.

2. The system of claim 1, wherein identifying additional media content items comprises applying a distance metric to compare the media content item and individual additional media content items in order to identify the additional media content items.

3. The system of claim 2, wherein extracting the features from the media content item comprises applying a machine learning model trained to extract features from one or more media content items.

4. The system of claim 3, wherein generating the training data comprises adding the one or more extracted features to the labels.

5. The system of claim 2, wherein the media content items comprise videos created by users to share with other users, wherein the features are extracted on a frame-by-frame basis.

6. The system of claim 2, wherein the media content items comprise content augmentations created by users to share with other users, wherein the extracted features include the augmentations that are applied to a camera feed in real-time.

7. The system of claim 2, wherein at least some of the media content items are in a different format than the additional media content items.

8. The system of claim 7, wherein the media content items that are in the different format are compared with the additional media contents based on the extracted features.

9. The system of claim 1, wherein the additional media content items were created by users in a different time period than when the accessed media content items were created.

10. The system of claim 1, wherein the additional media content items were created by different users than the users that created the accessed media content items.

11. The system of claim 1, wherein the additional media content items are identified based on metadata of the accessed media content items.

12. The system of claim 11, wherein the metadata comprises a location where a user created the individual media content item.

13. The system of claim 1, wherein the retraining criterion comprises a keyword indicative of a trend, wherein the operations further comprise tracking the use of one or more keywords in media content items and the retraining criterion includes meeting a threshold number of uses of the keyword.

14. The system of claim 1, wherein the media content items comprise images or videos, and the interaction functions comprise media content items created by users and shared with other users.

15. The system of claim 14, wherein the media content items that were created by users do not include labels for training the machine learning model, wherein generating the training data includes identifying keywords in captions of individual media content items or comments to the media content items from other users.

16. The system of claim 14, wherein the media content items comprise content augmentations that add interactive digital elements in real-time to a camera feed.

17. The system of claim 1, wherein the operations further comprise adding the training data to an existing set of training data, wherein repeating the set of operations further comprises adding newly accessed training data to the existing set of training data such that the existing set of training data increases in size with each repeating of the set of operations.

18. The system of claim 17, wherein processing the training data using the machine learning model to generate the media content item output further comprises processing the existing set of training data using the machine learning model.

19. A method comprising:
training a machine learning model by performing a set of operations comprising:
accessing media content items associated with interaction functions initiated by users of an interaction system, wherein the media content items comprise images, videos, or content augmentations of the users posted on the interaction system enabling other users to view the posted media content items;
generating training data including labels for the media content items, wherein the labels are indicative of one or more characteristics of the media content items;
extracting features from a media content item of the media content items;
identifying additional media content items to include in the training data based on the extracted features from the media content item;
processing the training data using a machine learning model to generate a media content item output; and
updating one or more parameters of the machine learning model based on the media content item output; and
repeating the set of operations to retrain the machine learning model based on a retraining criterion being met.

20. A non-transitory computer-readable storage medium storing instructions that, when executed by at least one processor, cause the at least one processor to perform operations comprising:
training a machine learning model by performing a set of operations comprising:
accessing media content items associated with interaction functions initiated by users of an interaction system, wherein the media content items comprise images, videos, or content augmentations of the users posted on the interaction system enabling other users to view the posted media content items;
generating training data including labels for the media content items, wherein the labels are indicative of one or more characteristics of the media content items;
extracting features from a media content item of the media content items;
identifying additional media content items to include in the training data based on the extracted features from the media content item;
processing the training data using a machine learning model to generate a media content item output; and
updating one or more parameters of the machine learning model based on the media content item output; and
repeating the set of operations to retrain the machine learning model based on a retraining criterion being met.

* * * * *